US008370255B2

(12) United States Patent
Lilly et al.

(10) Patent No.: US 8,370,255 B2
(45) Date of Patent: Feb. 5, 2013

(54) SYSTEM AND METHOD FOR PROVIDING EXTRA LINES OF CREDIT

(75) Inventors: Joseph D. Lilly, Richmond, VA (US);
Colin Jeffrey Ruh, Richmond, VA (US);
Jeff G. York, Richmond, VA (US);
Philip G. Walker, Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 12/801,939

(22) Filed: Jul. 2, 2010

(65) Prior Publication Data

US 2010/0274700 A1 Oct. 28, 2010

Related U.S. Application Data

(60) Continuation of application No. 11/976,165, filed on Oct. 22, 2007, now Pat. No. 7,904,384, which is a division of application No. 09/780,468, filed on Feb. 12, 2001, now Pat. No. 7,689,502.

(51) Int. Cl.
*G06Q 40/00* (2006.01)

(52) U.S. Cl. ............... 705/39; 705/40; 705/41; 705/42; 705/43; 705/44

(58) Field of Classification Search .................... 705/14, 705/35, 36, 38, 39, 40, 41, 42, 43, 44
See application file for complete search history.

(56) References Cited

U.S. PATENT DOCUMENTS

| | | | |
|---|---|---|---|
| 4,837,422 A | 6/1989 | Dethloff et al. | |
| 5,724,521 A | 3/1998 | Dedrick | |
| 5,864,830 A | 1/1999 | Armetta et al. | |
| 5,913,040 A | 6/1999 | Rakavy et al. | |
| 5,914,472 A | 6/1999 | Foladare et al. | |
| 5,953,710 A | 9/1999 | Fleming | |
| 5,984,180 A | 11/1999 | Albrecht | |
| 6,014,502 A | 1/2000 | Moraes | |
| 6,021,943 A | 2/2000 | Chastain | |
| 6,032,134 A | 2/2000 | Weissman | |
| 6,032,136 A | 2/2000 | Brake, Jr. et al. | |
| 6,044,360 A | 3/2000 | Picciallo | |
| 6,157,946 A | 12/2000 | Itakura et al. | |
| 6,173,269 B1 | 1/2001 | Solokl et al. | |
| 6,182,895 B1 | 2/2001 | Albrecht | |

(Continued)

OTHER PUBLICATIONS

"Bankers urged to monitor card portfolios as bankruptcies rise," ABA Retail Banker International, vol. 47, pp. 2-3, Jan. 1987 (1 page abstract).

(Continued)

*Primary Examiner* — Nga B. Nguyen
(74) *Attorney, Agent, or Firm* — Finnegan, Henderson, Farabow, Garrett & Dunner, LLP

(57) ABSTRACT

A system and method for upgrading existing credit cards with additional lines of credit is disclosed. Credit information associated with customers holding credit cards issued by a credit card issuer are analyzed to determine a level of risk associated with each customer. One or more extra line of credit may be established for selected customers based on the determined level of risk associated with each customer. Each extra credit line may be exclusively associated with a selected set of vendors that have a partnership agreement with the credit card issuer. The credit card issuer may allow customers to select vendors to be associated with the extra credit line or may automatically choose vendors for selected customers. Customers with established extra credit lines may purchase goods and/or service directly from vendor sites or at the credit card issuer's web sites. Purchases at selected vendor sites may be automatically applied to a customer's newly established extra credit line. Additionally, a customer may choose to apply purchases to their extra credit lines or their primary line of credit.

24 Claims, 17 Drawing Sheets

U.S. PATENT DOCUMENTS

| | | | |
|---|---|---|---|
| 6,324,524 | B1 | 11/2001 | Lent et al. |
| 6,330,544 | B1 | 12/2001 | Walker et al. |
| 6,353,811 | B1 | 3/2002 | Weissman |
| 6,422,462 | B1 | 7/2002 | Cohen |
| 6,636,833 | B1 | 10/2003 | Flitcroft et al. |
| 6,764,001 | B1 | 7/2004 | Kawai et al. |
| 6,865,547 | B1 | 3/2005 | Brake, Jr. et al. |
| 6,868,395 | B1 | 3/2005 | Szlam et al. |
| 6,873,968 | B2 | 3/2005 | Ehrlich et al. |
| 6,915,277 | B1 | 7/2005 | Manchester et al. |
| 7,006,993 | B1 | 2/2006 | Cheong et al. |
| 7,072,864 | B2 | 7/2006 | Brake, Jr. et al. |
| 7,328,840 | B2 | 2/2008 | Kawai et al. |
| 7,505,925 | B2 | 3/2009 | Turner et al. |
| 2001/0014867 | A1* | 8/2001 | Conmy ............... 705/9 |
| 2001/0044762 | A1 | 11/2001 | Nault |
| 2001/0051920 | A1 | 12/2001 | Joao et al. |
| 2002/0038234 | A1* | 3/2002 | Fu et al. ............... 705/8 |
| 2002/0052788 | A1 | 5/2002 | Perkes et al. |
| 2002/0062279 | A1 | 5/2002 | Behrenbrinker et al. |
| 2002/0087467 | A1 | 7/2002 | Mascavage et al. |
| 2002/0116304 | A1 | 8/2002 | Casper et al. |
| 2002/0138418 | A1 | 9/2002 | Zarin et al. |
| 2002/0152160 | A1 | 10/2002 | Allen-Rouman et al. |
| 2002/0156723 | A1 | 10/2002 | Lilly et al. |
| 2002/0174030 | A1 | 11/2002 | Praisner et al. |
| 2003/0004866 | A1 | 1/2003 | Huennekens et al. |
| 2003/0004868 | A1 | 1/2003 | Early et al. |
| 2003/0009393 | A1 | 1/2003 | Norris |
| 2003/0046222 | A1 | 3/2003 | Bard et al. |
| 2003/0097270 | A1 | 5/2003 | Musselwhite et al. |
| 2003/0204470 | A1 | 10/2003 | Manchester et al. |
| 2004/0117300 | A1 | 6/2004 | Jones et al. |
| 2004/0254848 | A1 | 12/2004 | Golan et al. |
| 2006/0136121 | A1* | 6/2006 | Eisen ............... 701/200 |
| 2006/0143121 | A1 | 6/2006 | Treider et al. |
| 2007/0078759 | A1 | 4/2007 | Lilly et al. |
| 2007/0080212 | A1 | 4/2007 | Rosenblatt et al. |

OTHER PUBLICATIONS

"Cowbranded Card," *Card Fax*, vol. 96, No. 205, Nov. 14, 1996 (1 page).

"Delta Will Fly Its Cobranded Cards to More Countries," *Card Fax*, Feb. 6, 2001 (2 pages).

"Dean Witter Ups the Ante With a Two-Tier Credit Line," *Credit Card News*, Sep. 15, 1995 (3 pages).

"Dean Witter's New Family Plan," *Credit Card Management*, vol. 9. No. 2, pp. 64+, May 1996 (4 pages).

"Education a Perk in New AT&T College Credit Card Offer," Card News, vol. 1, No. 16, Aug. 23, 1993 (1 page).

Final Office Action mailed Nov. 27, 2009, by the U.S. Patent and Trademark Office in U.S. Appl. No. 11/265,111 (9 pages).

Lucas, "Discover's New Chemistry," *Credit Card Management*, vol. 8, No. 12, pp. 50-56 (8 pages).

Lucas, "Store card software gets dressed up," *Credit Card Management*, vol. 8, No. 6, pp. 90-93 (5 pages).

Marshall, "Zap—The Computer Lops Off Another Bad Risk," United States Banker, vol. 102, No. 8, pp. 49-50, Aug. 1992 (3 pages).

Notice of Allowability dated Oct. 30, 2008, issued by U.S. Patent and Trademark Office in U.S. Appl. No. 09/924,684 (10 pages).

Office Action dated Mar. 9, 2009, issued by U.S. Patent and Trademark Office in U.S. Appl. No. 11/265,111 (8 pages).

Office Action dated Jul. 10, 2008, issued by U.S. Patent and Trademark Office in U.S. Appl. No. 09/924,684 (10 pages).

"Retail Cards SPS Finds the Skies to Be Friendly With United's Private-Label Card," *Credit Card News*, Jul. 1, 1994 (2 pages).

Punch, "Santa Claus comes to retail cobranding," *Credit Card Management*, vol. 15, No. 10, pp. 24-30, Dec. 2002 (7 pages).

"Sears Tests Starter Card," *Card Fax*, vol. 1997, No. 21, Jan. 28, 1997 (1 page).

* cited by examiner

|  | SEGMENT 1 | | | SEGMENT 2 | | | SEGMENT 3 | | |
|---|---|---|---|---|---|---|---|---|---|
| CUSTOMER | AVAILABLE BALANCE | INTEREST RATE | FEE | ACTIVE | AVAILABLE BALANCE | INTEREST RATE | FEE | ACTIVE | AVAILABLE BALANCE | INTEREST RATE | FEE | ACTIVE |
| CUSTOMER A | $10000 | 16.5% | $5 | Y | $2000 | 20% | $25 | Y | $1000 | 12.5% | $2.50 | Y |
| CUSTOMER B | $5000 | 18% | $5 | Y | $500 | 20% | $25 | Y | $300 | 16% | $2.50 | Y |
| CUSTOMER C | $2500 | 18.5% | $5 | Y | $200 | 20% | $25 | Y | $250 | 18.5% | $2.50 | N |

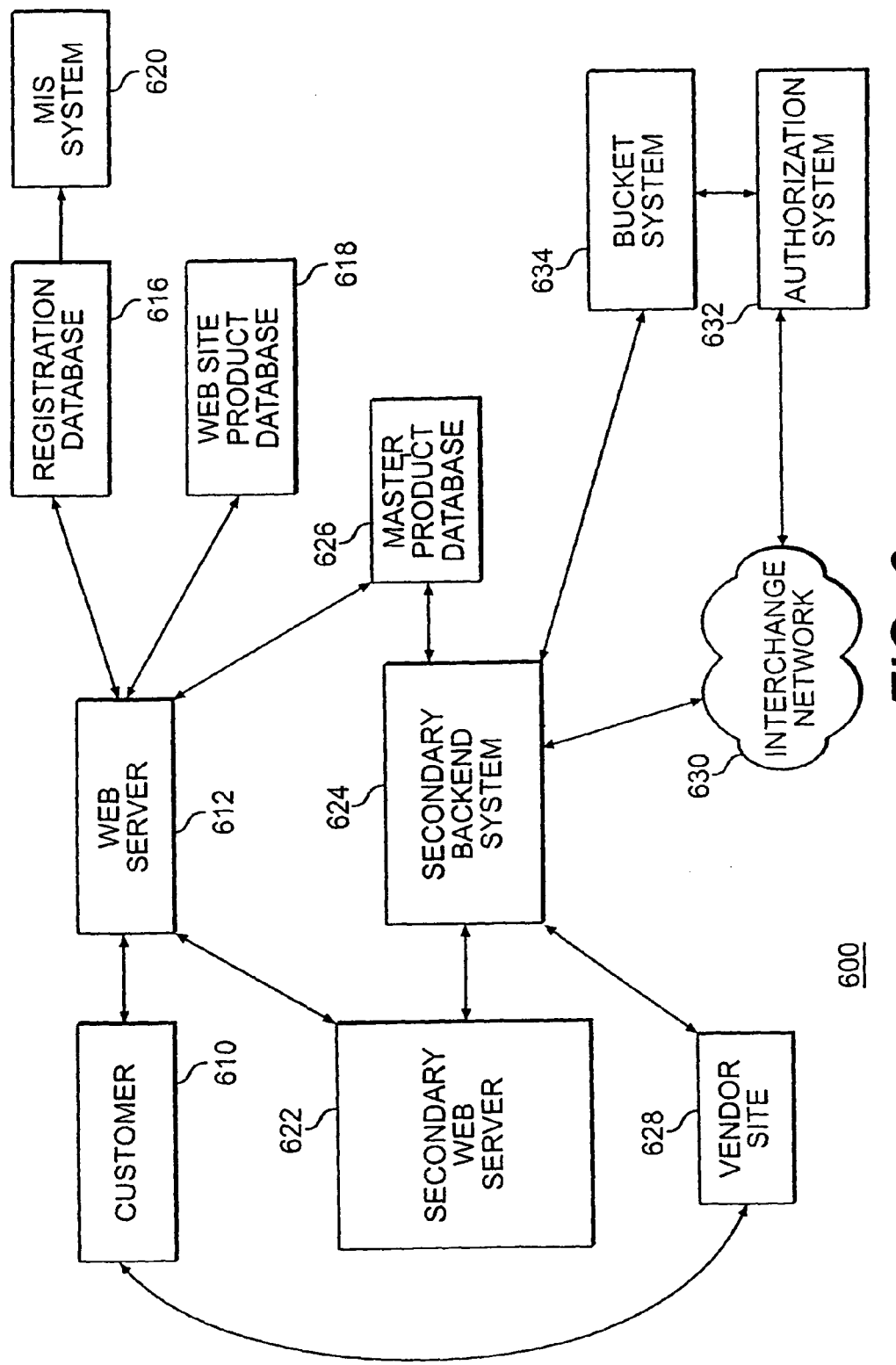

YOUR $250.00 BONUS LINE OF CREDIT IS WAITING!

0062899999999   0001   16
LINDSAY P. SAMPLE
APT. 10A
123 W. BROAD STREET
ANYTOWN, VA 99999-9999

DEAR LINDSAY P. SAMPLE,

TO THANK YOU FOR BEING A VALUED CARDHOLDER, WE'D LIKE TO GIVE YOU TWO THINGS YOU CAN REALLY USE DURING THE HOLIDAYS: MORE TIME TO SHOP FOR GIFTS AND MORE MONEY TO SHOP WITH!

SO WE'RE OFFERING YOU SOME EXTRA SPENDING MONEY IN THE FORM OF A $250 BONUS LINE OF CREDIT...GOOD EXCLUSIVELY ONLINE AT WEBSITE NAME. OUR SITE OFFERS YOU TREMENDOUS CONVENIENCE, SPECIAL SAVINGS-AND OVER 100,000 PRODUCTS TO CHOOSE FROM. YOU'LL FIND BRAND NAME PRODUCTS AND SOME GREAT GIFT IDEAS FOR THE HOLIDAYS!

MORE CREDIT WHEN YOU SHOP WITH US
YOUR BONUS LINE OF CREDIT IS A SEPARATE LINE OF CREDIT FROM YOUR EXISTING CREDIT CARD ACCOUNT-CREDIT TO BE USED EXCLUSIVELY FOR SHOPPING AT WEBSITE NAME. PURCHASES MADE AT WEBSITE NAME USING YOUR $250 BONUS CREDIT WILL NOT AFFECT YOUR EXISTING CREDIT LINE. IT'S JUST AN EXTRA $250 FOR THE HOLIDAYS!

IT'S EASY...
1. GO TO HOME PAGE URL
2. CLICK ON THE LINK TO WEBSITE NAME

DETAILS ABOUT YOUR CREDIT OFFER (ALONG WITH THE OPTION TO ACCEPT OR DECLINE THE OFFER) WILL APPEAR DURING THE CHECKOUT PROCESS ON WEBSITE NAME.

SHOP TODAY!
WHY WAIT? CHECK OUT WEBSITE NAME NOW AND TAKE FULL ADVANTAGE OF THE EXTRA CREDIT WE'RE OFFERING YOU! BUT HURRY-YOU MUST ACTIVATE YOU BONUS LINE OF CREDIT BY DECEMBER 31, 2001 WHEN THIS OFFER EXPIRES!

CONGRATULATIONS! YOU'VE EARNED A BONUS LINE OF CREDIT

CREDIT CARD ISSUER IS PLEASED TO OFFER YOU A $250.00 BONUS LINE OF CREDIT FOR YOU TO USE AT WEBSITE NAME. THE BONUS LINE OF CREDIT WILL ALLOW YOU TO RECEIVE THE ADDITIONAL PURCHASING POWER OF A SECOND LINE OF CREDIT AND THE FLEXIBILITY TO BUY MORE OF WHAT YOU WANT FROM WEBSITE NAME.

REMEMBER, THIS BONUS LINE OF CREDIT CAN ONLY BE USED FOR PURCHASES AT WEBSITE NAME.

PLEASE READ OUR IMPORTANT DISCLOSURES AND PRINT OR SAVE THEM FOR YOUR RECORDS. THEN, SIMPLY ACCEPT OR DECLINE THE OFFER BELOW TO CONTINUE WITH YOUR CHECKOUT.

[ I ACCEPT ]   [ NO THANKS ] — 710D

IMPORTANT DISCLOSURES

SPECIAL PURCHASE SEGMENT
A SPECIAL PURCHASE SEGMENT WILL BE ADDED TO YOUR ACCOUNT FOR A ONE-TIME ACTIVATION FEE OF $19.00. THIS SEGMENT IS SOLELY FOR TRANSACTIONS MADE WITH YOUR BONUS CREDIT LINE AT WEBSITE NAME.

YOUR SPECIAL PURCHASE SEGMENT WILL HAVE AN ANNUAL PERCENTAGE RATE OF 19.8% AND INCLUDES A 25-DAY GRACE PERIOD IF YOU PAY YOUR ENTIRE NEW BALANCE IN FULL BY YOUR NEXT PAYMENT DUE DATE.

THIS CHANGE WILL BE EFFECTIVE WITHIN TWO BILLING PERIODS AFTER YOUR FIRST TRANSACTION THROUGH WEBSITE NAME.

OTHER TERMS AND CONDITIONS

ALL OTHER TERMS AND CONDITIONS OF YOUR SPECIAL BONUS LINE OF CREDIT ARE THE SAME AS YOUR CARDHOLDER ACCOUNT, AND ANY PREVIOUS AMENDMENTS THERETO.

ACKNOWLEDGEMENT

I HAVE READ THE IMPORTANT DISCLOSURES ABOVE AND WOULD LIKE TO ACCEPT MY BONUS LINE OF CREDIT!

SYSTEM AND METHOD FOR PROVIDING EXTRA LINES OF CREDIT

This is a continuation of U.S. patent application Ser. No. 11/976,165, filed Oct. 22, 2007 now U.S. Pat. No. 7,904,384, which is a division of U.S. patent application Ser. No. 09/780,468, filed Feb. 12, 2001, now U.S. Pat. No. 7,689,502, all of which are incorporated herein by reference in their entirety.

BACKGROUND OF THE INVENTION

I. Field of the Invention

This invention relates to credit card products and to systems and methods for providing and using such products. More particularly, the invention relates to systems and methods for modifying an existing credit card product to provide one or more extra lines of credit and associating one or more vendors with one or more extra lines of credit on a credit card product. The invention also relates to systems and methods for editing vendor profiles associated with one or more extra lines of credit for existing and newly issued credit card products.

II. Background and Material Information

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt to their credit card account, which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred (also referred to as a revolving charge credit line).

The spending power of a credit card (i.e., the maximum amount of funds that is financed to the cardholder for making purchases) is typically limited to a particular amount that is predetermined by the issuer of the card. This amount is commonly referred to as the "credit limit" of the credit card. The credit limit provides the cardholder with a line of credit (also referred to as a credit line). The size of the issuer-imposed credit limit is generally based on a number of non-exclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance," while the remaining or available balance of the credit limit is typically called the "available balance" and reflects the dynamically adjusted current spending power of the credit card. The cardholder may increase the available balance up to the credit limit, by paying the outstanding balance to the issuer.

Credit card issuers usually provide general purpose credit cards that may be used for a plurality of different goods and services and with a wide variety of merchants. For example, a Visa, MasterCard, American Express, Dinner's Club are examples of general purpose credit cards. Since general purpose credit cards are intended for "general use" by a cardholder, they are typically not associated with a single merchant/vendor or limited in use.

Some credit card issuers or merchants issue private label credit cards (e.g., a Sears Charge Card) for use exclusively with a merchant's goods and/or services. Such private label credit cards may be issued to customers of the merchant to provide an incentive to purchase the goods and/or services of the merchant. Private label credit cards may be issued with different types of terms and conditions. For example, a private label credit card may include a private label credit line with a predetermined credit limit and the possibility of deferring payment on an outstanding balance with a finance or interest charge (e.g., a revolving credit line). A private label credit card may also include a charge account that requires the cardholder to pay the balance in full at the end of each month or the card may include an installment line of credit where the cardholder is required to make a fixed, periodic payment to the merchant (or the merchant's representative) until the installment debt is paid.

Private label credit cards have several disadvantages. For example, the credit line of a private label credit card may only be used to make purchases in connection with the merchant's goods and/or services. As a result, a private label credit card limits a customer's overall use of the credit card. Moreover, if the private label credit card includes a charge account that requires full payment of the outstanding balance at the end of the month, the cardholder tends to limit use of the merchant's credit card to an amount that can be paid at the end of the month.

To overcome the above mentioned disadvantages, credit cards have been created that offer dual lines of credit. Dual line credit cards include a general purpose credit line and a private label credit line. Dual line cards provide cardholders with the ability to purchase goods from a specific merchant or make general purchases for a wide variety of goods or services. Methods and systems for providing dual line credit cards are described in U.S. patent application Ser. No. 09/659,585, filed Sep. 11, 2000, which is expressly incorporated herein by reference in its entirety.

Although dual line credit cards provide advantages over conventional credit cards, they require credit card issuers to generate and issue new accounts or cards to customers. This requires customers to prepare new credit applications that card issuers have to process before a new card may be issued. Customers must therefore wait until the new credit card is received before they can use the dual line credit card. Furthermore, although the use of dual lines of credit on a single card provides versatility for customers and merchants, the resources used by the card issuer to generate such credit cards increases with each accepted application. Also, dual line credit cards are still limited in the sense that each private label credit line is associated with a specific merchant or vendor; and, thus restricts a customer's purchasing power with the private label credit line.

SUMMARY OF THE INVENTION

Methods, systems and articles of manufacture consistent with the principles of the present invention enable credit card issuers to offer selected customers with the option of obtaining extra lines of credit for their existing cards.

Consistent with the principles of the invention, a credit card issuer determines a selected customer base from which to offer additional lines of credit. Once the issuer sets up a database associated with each of these customers' accounts, offers are extended to these customers using a variety of communication channels. These channels may include conventional solicitation techniques, as well as on-the spot offers while customers are purchasing goods.

Consistent with the principles of the invention, credit card issuers in partnership with participating vendors may offer a customer one or more extra lines of credit that are each associated with a specific group of vendors. Vendor group credit lines may be selected by each customer or may be determined by the card issuer.

Consistent with the principles of the invention, credit card issuers may authorize transactions by customers attempting to purchase goods and/or services from specific vendors using their credit card product with extra credit. The credit card issuer may authorize transactions based on vendor lists associated with the customer. Furthermore, the card issuers may solicit and register new customers for the extra credit card products with multiple lines of credit during a transaction session, whether on-line or off line.

Methods, systems and articles of manufacture consistent with the principles of the present invention enable credit card holders to obtain additional credit lines on their existing cards, without having to wait for a new card. Furthermore, methods, systems and articles of manufacture consistent with the present invention enable customers and card issuers to chose vendors that may be associated with the extra lines of credit.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 3B is an exemplary segment database for activating extra lines of credit, in accordance with the present invention;

FIG. 6 is another exemplary system environment for providing a credit card with multiple lines of credit, in accordance with the present invention;

FIG. 7C is an exemplary offer for an extra line of credit, in accordance with the present invention; and FIG. 7D is another exemplary offer for an extra line of credit, in accordance with the present invention.

DETAILED DESCRIPTION

Figure 1:
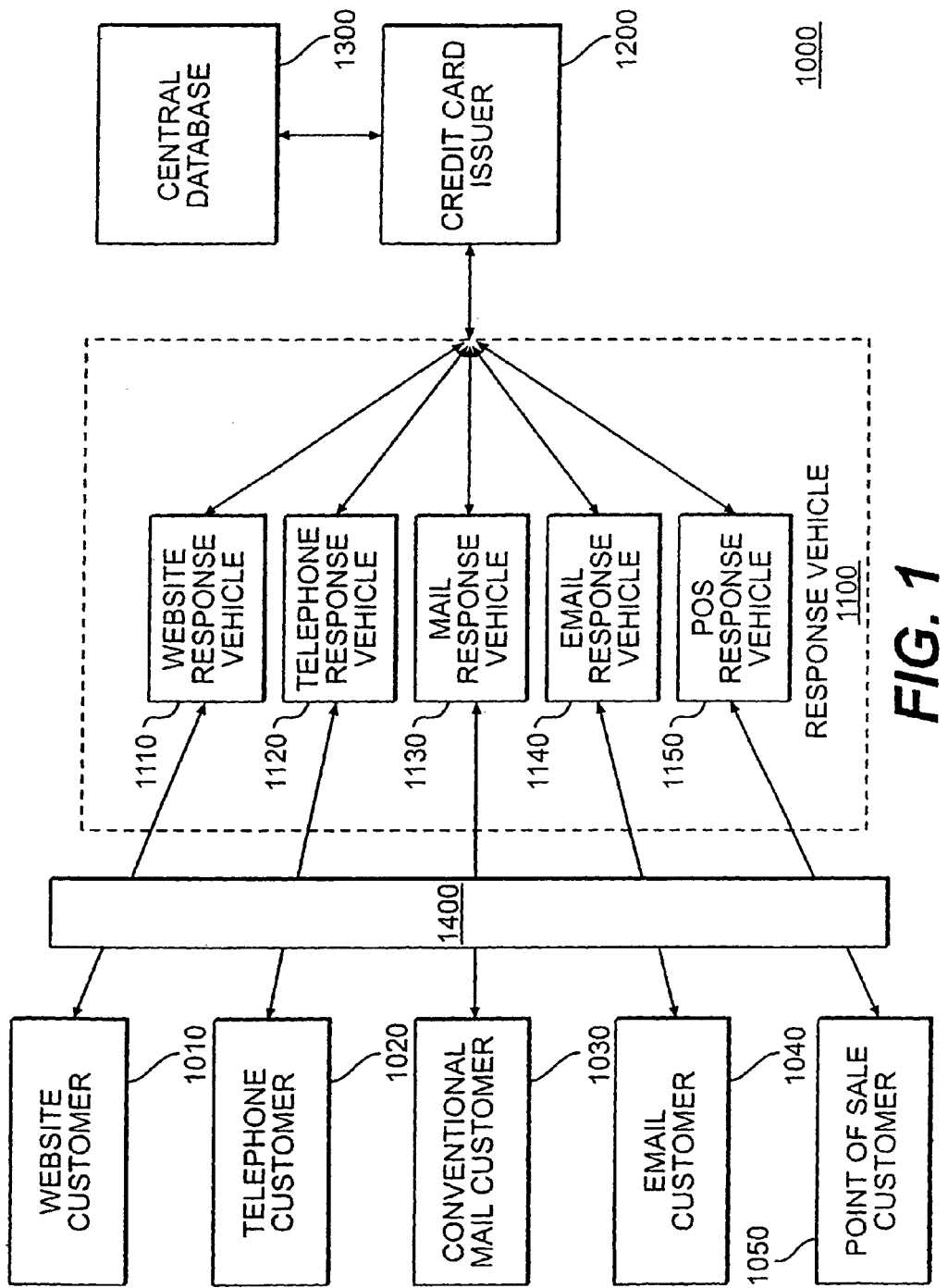
FIG. 1 illustrates an exemplary system environment in which the features and principles of the present invention may be implemented.

Reference will now be made in detail to the invention, examples of which are illustrated in the accompanying drawings. Wherever possible, the same reference numbers will be used throughout the drawings to refer to the same or like parts.

Generally, the present invention is directed to a system and method for providing one or more extra lines of credit on existing credit cards. In accordance with one embodiment of the present invention, credit card holders are presented offers for obtaining extra line(s) of credit for their existing credit cards. These offers may be presented through conventional solicitation techniques, as well as during customer purchase transactions. The additional line(s) of credit may include, for example, one or more private label credit line(s) and a general purpose credit line. The private label credit line(s) may be associated with a variety of vendor partnership structures. That is, a customer may have a private label credit line associated with a single vendor, or with a group of vendors. Purchases to be charged to the private label credit line(s) may be only authorized at vendor sites associated with the vendor partnership structure. The general purpose credit line may also be provided to permit purchases for a variety of goods and/or services from merchants that accept the general purpose credit line.

Methods and systems consistent with the principles of the present invention permit a cardholder or consumer to obtain a credit card with multiple lines of credit without waiting for a newly issued card. Once the card issuer has authorized and processed a customer's acceptance of an extra credit plan, the customer may carry only a single credit card that can be used both as a general credit card and as a private label credit card. Moreover, a card issuer may offer customers a wide variety of options corresponding to the types of vendors the private label credit line(s) are to be associated with. Also, because the popularity of on-line shopping is increasing, card issuers may offer the same advantages to customers who shop at a card issuer's branded web site, as well as at specific vendor websites. Thus, the features of the present invention may be used to target existing credit card customers and promote or encourage on-line shopping at specific web site(s).

The present invention also relates to systems and methods for upgrading or modifying an existing credit card product with multiple lines of credit, wherein one or more lines of credit (such as a general purpose credit line) is embedded into a main line of credit (such as a private label line of credit). Each embedded credit line may permit the cardholder to make revolving credit charges for a wide variety of goods and services. The embedded credit lines may include, for example, different types of the credit lines (e.g., general purpose credit lines), with the main line of credit (e.g., the private label line of credit) providing an incentive to the cardholder to make purchases with specific merchant(s). Each embedded credit line (i.e., a general purpose credit line) may have a maximum credit limit that is greater than, equal to or less than the maximum credit limit for the main line of credit (i.e., the private label credit line). Any charge to the embedded credit line may cause a dollar-for-dollar reduction in the amount of available credit for the main credit line. For example, with a main credit line that is established as a private label credit line of $6,000, and an embedded credit line that is established as a general purposed credit line of $4,000, charges applied to the general purpose credit line will reduce the available credit under the private label credit line. For instance, a $1,500 charge to the general purpose credit line will reduce the available credit under the private label credit line by $1,500 to $4,500 (assuming there are no other outstanding charges). Such a charge will also reduce the available credit under the general purpose credit line by $1,500 to $2,500. Additionally, the private label credit line may be configured to have a credit line that is unaffected by charges applied to the general credit line.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary system environment 1000 in which the features and principles of the invention may be implemented. As illustrated in FIG. 1, the system environment 1000 includes a plurality of customers (1010-1050), a response vehicle system 1100 including a plurality of different response vehicles (1110-1150), a credit card issuer 1200, a central database 1300 and a communications channel 1400.

Each customer in system environment 1000 is associated with a different customer category. For instance, customer(s) 1010 may be web site customer(s) that access and retrieve information through a web site. This web site may be a branded web site that is operated by one or more vendors, or may be a web site operated by the card issuer. Also, the web site may include web sites operated by vendors that are in partnership with the card issuer 1200. Customer(s) 1020 may be telephone customers that access and receive information using conventional telephonic communication techniques and systems. This includes, for example, wireline and wireless telephony systems. Customer(s) 1030 may be conventional mail customer(s) that access and receive information by conventional mail techniques and services. This includes, for example, customer(s) that are part of a credit card issuer's mailing list. Customer(s) 1040 may be customer(s) that access and receive information using electronic mail services, and customer(s) 1050 may be point of sale customer(s) that perform purchase transactions and receive information at a vendor's point of sale terminal or physical store location. Customer(s) 1010-1050 may also represent entities (such as an individual, a group of individuals, corporate entities, or any combination thereof), that hold credit card accounts with the credit card issuer 1200. The categories of customer(s) illustrated in FIG. 1 are exemplary and should not be considered limiting. For example, a variety of different customer categories may also be implemented in environment 1000, such as customers using kiosk computers or personal digital assistants (PDAs).

Response vehicle 1100 represents a system for handling communications between the customer(s) 1010-1050 and credit card issuer 1200. Response vehicle 1100 may be part of a credit card issuer's network and, as shown in FIG. 1, include a plurality of response vehicles 1110-1150 that correspond to different category groups of customer(s) 1010-1050. Each response vehicle is responsible for handling communications to and from a particular customer. For example, telephone response vehicle 1120 handles telephonic communications between the customer 1020 and credit card issuer 1200. Thus, in the event credit card issuer 1200 wishes to solicit customers telephonically, response vehicle 1120 includes the necessary systems to support such operations. Response vehicle 1130, on the other hand, includes the necessary systems and organizations to handle conventional mail processing to and from customer(s) 1030. Response vehicle system 1140 includes the necessary systems and organizations to process electronic mail transactions with customer 1040. Response vehicle 1150, in turn, includes systems and organizations that enable communications with customers located at a point of sale (POS) terminal. Response vehicle system 1100 may receive responses from the customer(s) and forward them to card issuer 1200 for appropriate processing. Notifications to the customer(s) also are performed from issuer 1200 to the customer(s) through response vehicle 1100.

Communication channel 1400 facilitates communications between the various customer(s) and response vehicle system 1100 illustrated in FIG. 1. Such communications may include communications related to offering and issuing extra lines of credit for existing credit cards. Communications channel 1400 may include, for example, a telephony-based network, a local area network (LAN), a wide area network (WAN), a dedicated intranet, the Internet, and/or a wireless network. Further, any suitable combination of wired and/or wireless components and systems may be incorporated into communications channel 1400. Any suitable combination of point-to-point communications or networked communications may also be incorporated into communication channel 1400 to facilitate communication between the different entities illustrated in FIG. 1. Moreover, any part of communication channel 1400 may implemented through traditional infrastructures or channels of trade, to permit operations associated with the extra credit offers to be performed manually or in-person by the various entities illustrated in FIG. 1.

Credit card issuer 1200 receives communication information from response vehicle system 1100 and processes it using central database 1300. Database 1300 may contain various information including credit information, potential customer lists, risk scores for potential extra credit customers, approved extra credit customers, private label credit limits for approved cardholders, general credit limits for approved cardholders, vendor tables including merchant identification numbers, customer information, purchase information, authorization information, and/or settlement information. Issuer 1200 also sends information to the response vehicle system 1100 for delivery to the appropriate customers. Credit card issuer 1200 is responsible for providing various credit cards and establishing associated accounts. Credit card issuer 1200 may include one or more of the following: a bank, an acquiring bank, a merchant bank, a merchant or any commercial institution capable of providing a credit card consistent with the features disclosed herein. Further, although FIG. 1 only illustrates one credit card issuer 1200, it is of course possible that more than one credit card issuer be provided in system environment 1000.

Figure 2:
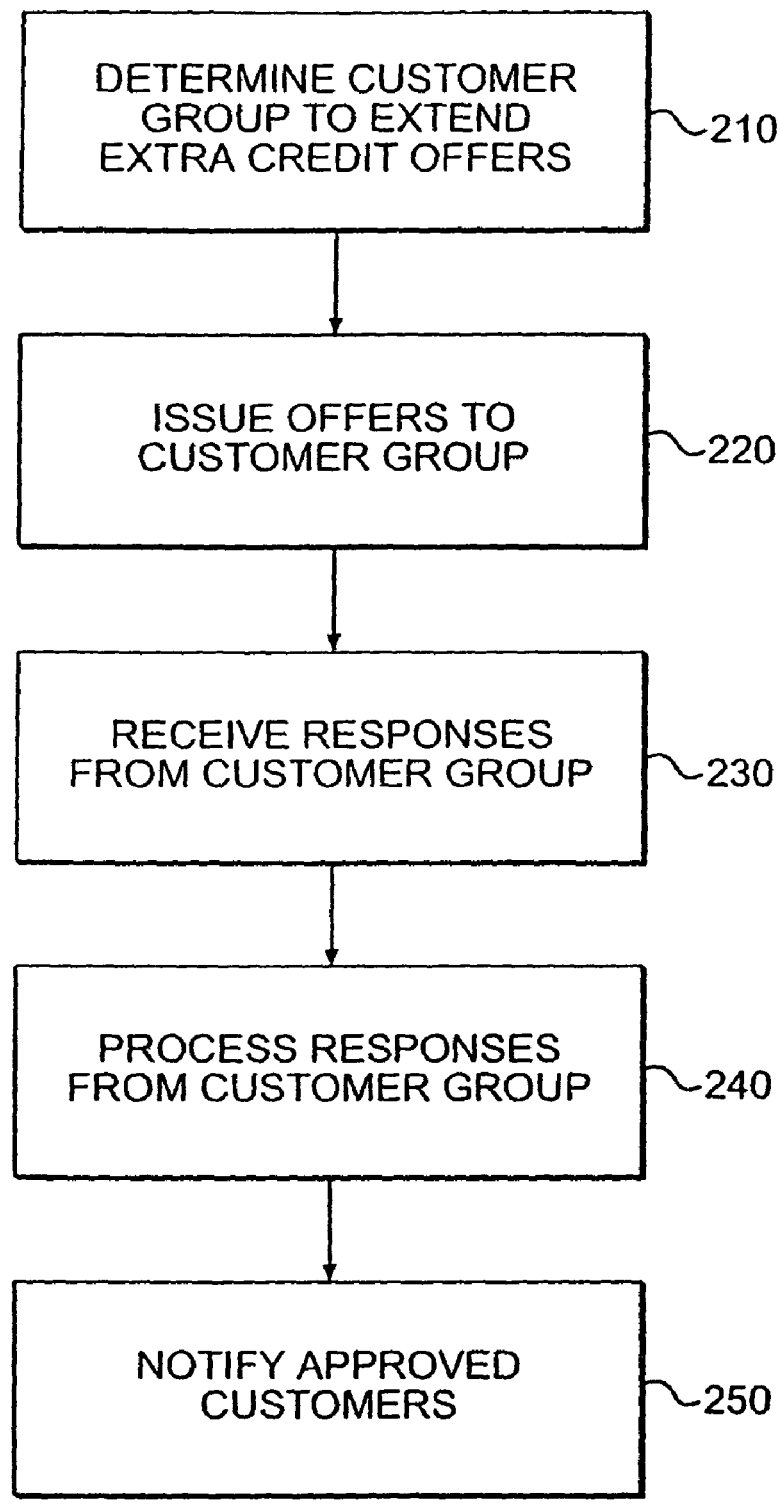
FIG. 2 is an exemplary flowchart for offering and adding extra credit lines to existing credit card accounts, in accordance with the present invention.

FIG. 2 illustrates an exemplary process associated with soliciting offers and processing responses for extra credit lines from credit card customers. According to an aspect of the invention, to issue additional lines of credit on existing credit cards, credit card issuer 1200 may identify specific customers to receive an extra credit line offer (Step 210). To evaluate and identify specific credit card customers, several factors may be considered by the card issuer 1200. Such factors may be based on credit information received from one or more credit information sources (i.e., sources that provide credit information to credit card issuer 1200). Credit information may also be provided to credit card issuer 1200 when customers respond to credit card offers from issuer 1200. Moreover, credit information may be requested by issuer 1200 while determining a target customer group to extend offers. Credit information may include credit history information and/or personal information (e.g., income, employment status, etc.) that is used when evaluating a customer's credit worthiness. Credit information sources may comprise commercial credit information source (such as TRW/Experian, Equifax and TransUnion or a similar commercial credit service bureau) and/or private credit information services. Credit information sources may also represent credit information that was provided by customers, such as when a customer applied for their existing credit card.

The credit information is analyzed to determine the credit worthiness or a level of risk associated with each cardholder. If a customer has sufficient credit for one or more extra credit lines, credit card issuer 1200 may approve the customer for inclusion in a target customer group. The target customer group includes all identified customers that card issuer 1200 will provide offers for extra line(s) of credit.

In accordance with the present invention, the extra line(s) of credit may be associated with private label credit lines. The extra line(s) of credit may include a single extra credit line or multiple extra line(s) of credit. For example, an existing credit card may include two lines of credit or "buckets". The first "bucket", may be a general purpose line of credit and the second "bucket" may be a cash advance line. Extra credit line(s) for this credit card may include a single "$3^{rd}$ bucket" or additional "$4^{th}$ and $5^{th}$ buckets." These buckets each may be dedicated to specific merchants or vendors, or groups thereof. Vendors may include merchants that offer goods and/or services to consumers. Each merchant may be a specific merchant of goods and/or services associated with private label credit line(s) of the present invention. Merchants may also include one or more merchants that offer goods and/or services that can be purchased through the general purpose credit line of the invention. In general, cardholders may make purchases from merchants with credit cards, including credit cards of the present invention that have been upgraded or modified to include multiple lines of credit.

Once card issuer 1200 has identified a target group of customers (which may be stored in central database 1300) it generates offers for these selected customers. The offers may vary for each customer based on the credit worthiness determined in Step 210 (see FIG. 2). That is, a customer with a high credit risk may be offered an extra credit line with a relatively low available balance (e.g., $500). Another customer with a lower credit risk may be offered an extra line of credit with a relatively high available balance (e.g., $5000). Moreover, additional credit lines or buckets may be offered to customers with low credit risks, while higher risk customers may be limited to a single extra credit line. The options available to the card issuer 1200 may extend beyond these options as well. Specific types of vendors or vendor groups may be associated with selected buckets offered to particular customers. For example, a high risk customer may be offered an extra credit line that is associated with a single vendor, while a low risk customer may be offered a plurality of buckets, with each bucket associated with a plurality of vendors these options and their processing are further described with reference to FIG. 3A.

In order to provide the versatility associated with vendor based credit line(s), a partnership may be established between one or more vendors and credit card issuer 1200. That is, selected vendors may be included in a master vendor list maintained by card issuer 1200, thus enabling customers of issuer 1200 to benefit from private label lines of credit associated with vendors. Vendors benefit from the additional business created by customers of issuer 1200 using their extra credit line(s) at their sites to purchase goods and/or services.

Once the offers are generated, they are sent to response vehicle system 1100 for distribution to the customers (Step 220). Each response vehicle in vehicle 1100 processes the offers in order to provide them to the customers through the proper medium or communication channel. For instance, response vehicle 1110 formulates offers for generation and viewing on one or more web sites. These web sites may be associated with a card issuer's web site or sites that are operated by selected vendors. Response vehicle 1150, on the other hand, processes the offers for presentation to customers who are performing a transaction at a point of sale terminal or at a vendor's site. Once each response vehicle has processed the offers, they are sent to the specified customers for response (Step 220). Customers 1010-1050 respond to the offers using the medium associated with their category. The responses are sent back to response vehicle system 1100 (Step 230), where they are processed for presentation to card issuer 1200 (Step 240).

Based on the category of a customer, responses may or may not be processed immediately. For instance, responses may be received and processed instantaneously for customers 1010, 1020 and 1050, while responses from customers 1030 and 1040 may be delayed. For example, suppose a customer 1010 using a personal computer, views a web site operated by issuer 1200. The site may include a designated page that is presented to the customer that displays the offer determined by issuer 1200. The customer may decide to accept or decline the offer by merely selecting an icon representing their choice. The selection is then sent back to response vehicle 1110. Response vehicle 1110 processes the response and prepares it for presentation to card issuer 1200. The response is processed at card issuer 1200 and a notification message is sent back to customer 1010, through response vehicle 1110 (Step 250). The notification message indicates to the customer that their response to an offer has been processed and whether or not an additional credit line was approved and available for use. The notification messages may be displayed through the page that the customer was viewing when the offer was presented or on a separate page. Further description of how card issuer 1200 processes the responses is explained below with reference to the description of FIG. 3A.

As can be seen, a customer who has accepted an offer through a web site may receive immediate notification that an extra credit line for their credit card is available for use. On the other hand, a customer who has been solicited by conventional mail, such as customer 1030, may respond to the offer by mailing back an acceptance form to the card issuer. The response form would be received and processed by response vehicle 1130, and eventually processed by credit card issuer 1200. Notification of the activation of an extra credit line may then be sent back to the customer using the same conventional mail process.

There may be a plurality of variations available to card issuer 1200 when communicating with customers. That is, a mail customer 1030 may wish to respond by telephone or through a web site. Additionally, customers may respond by one medium, and request notification by another. For instance, a customer 1030 who has received an offer in the mail, may respond by mail, yet request notification by email. Accordingly, a variety of user friendly options are available to customers for receiving and responding to the offers presented by card issuer 1200. The above descriptions are for illustration purposes alone and should not be viewed as limitations to the present invention. One of ordinary skill in the art would realize that any number of combinations of communication techniques may be implemented without departing from the principles of the present invention.

Figure 3A:
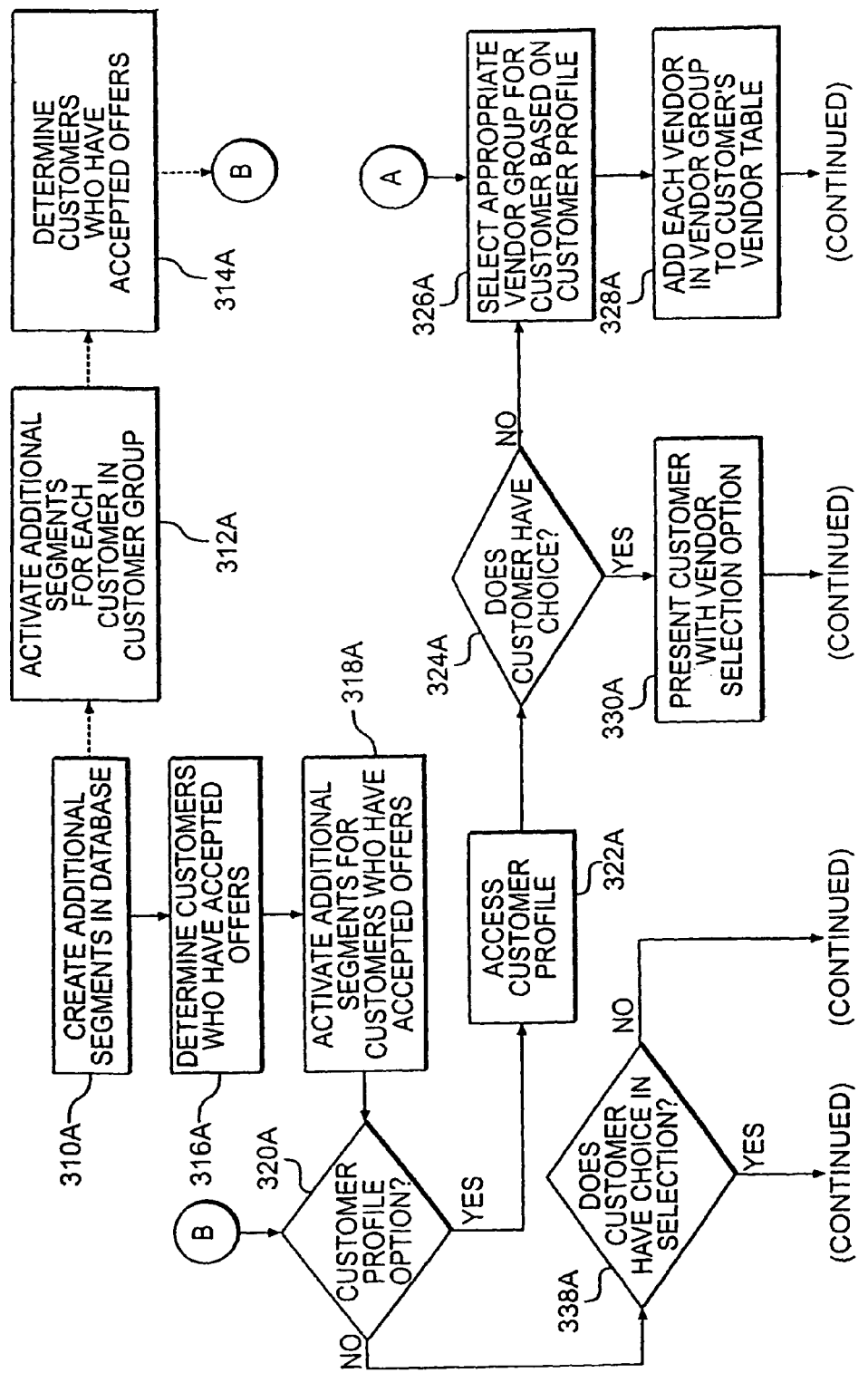
FIG. 3A is an exemplary flowchart for processing responses to offers for extra credit lines, in accordance with the present invention.
Figure 3A:
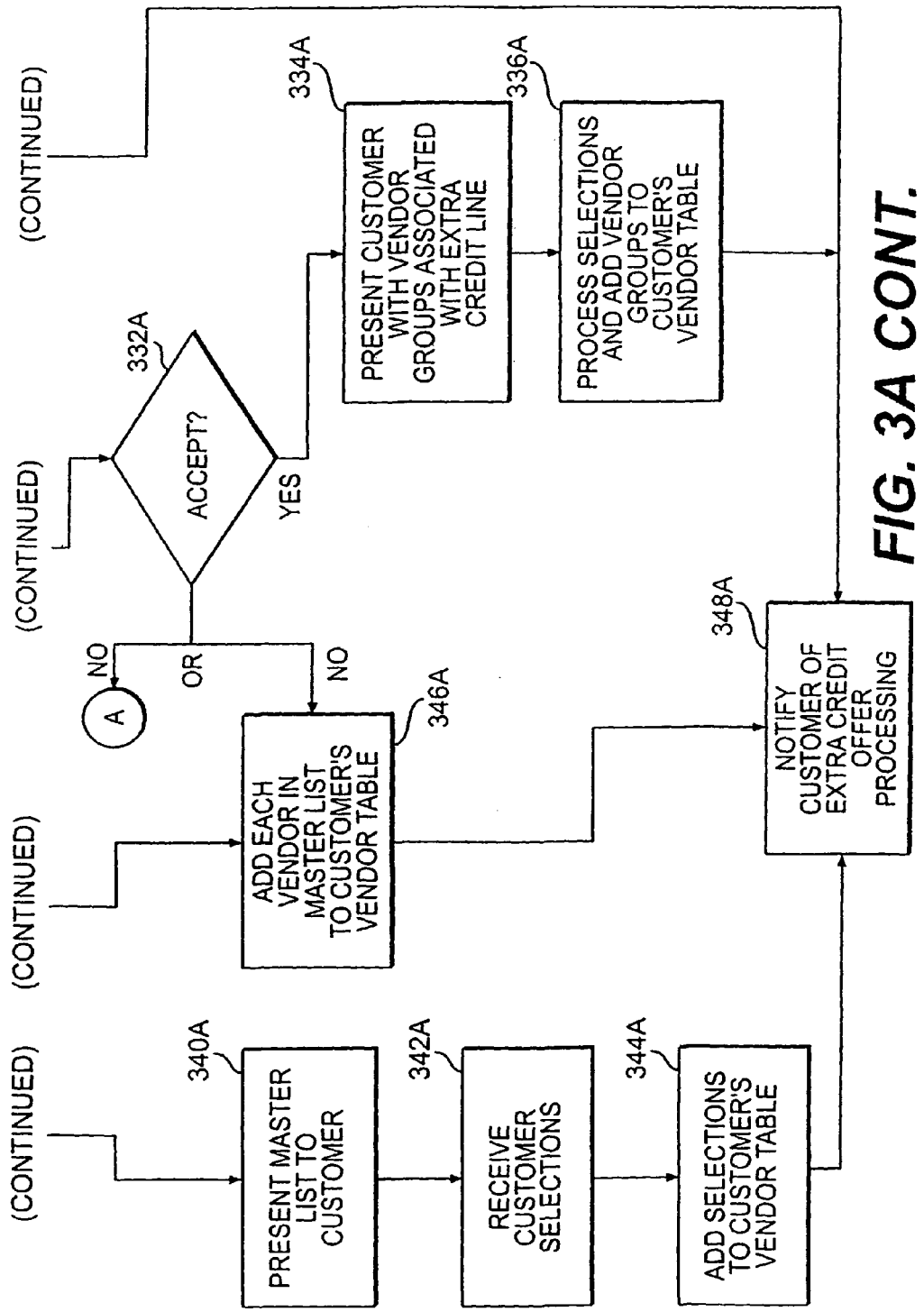

FIG. 3A illustrates the functions performed by credit card issuer 1200 when processing customer responses. Prior to generating offers or receiving responses, card issuer 1200 prepares central database 1300 for receiving extra credit information for each account. Central database 1300 may include a plurality of tables that store account information for each customer holding credit cards issued from credit card issuer 1200. One of these tables may be a main customer table that stores information reflecting each customer's account status. The main table may include "segments" that represent various information, such as the line(s) of credit available for a particular customer, outstanding and available balances, account numbers and any other cardholder data. To prepare central database 1300 for extra credit processing, card issuer 1200 creates additional segments in the main table that represent additional lines of credit for customers (Step 310A). Thus, if credit card issuer 1200 is preparing to offer three additional lines of credit or buckets, three new segments are created. Alternately, card issuer 1200 may create a new database table exclusively for customers included in the target customer group determined in Step 210 of FIG. 2. The new table would include the new segments reflecting the extra buckets offered to the target customer group.

FIG. 3B illustrates an exemplary main table 300B after a third segment has been added. Segment 1 (310B) may be associated with a general purpose credit line, while segment 2 (320B) may be associated with a cash advance credit line. In accordance with an aspect of the present invention, credit card issuer 1200 creates a new segment (330B) in main table 300B associated with an extra line of credit. Each segment 310B, 320B and 330B may include fields associated with a credit card customer's credit card account. For example, each segment in main table 300B may include an available balance field (340B), an interest rate field (350B), a transaction fee field (360B) and an activation flag field (370B). Available balance filed (340B) may be associated with an available balance for each respective credit line. Thus, customer A in main table 300B, has an available credit of $10,000, $2000 and $1000 for a general purpose credit line, cash advance credit line and an extra credit line, respectively. Field 350B may represent the interest rate applied to the respective credit line. That is, the interest rate applied to the general purpose credit line associated with customer A is 16.5%. Field 360B may represent a fee applied a particular customer's account for each transaction. Thus, for example, each time customer B uses his extra line of credit, a $2.50 fee is charged to his account. Field 370B may represent a flag that is set when a particular segment is activated. As shown in FIG. 3B, the extra credit line for customers A and B has been activated, while customer C's extra line of credit is not. The fields shown in FIG. 3B are exemplary, and should not be considered limiting. Any number of fields may be added to each segment to allow a credit card issuer the versatility in maintaining a customer's credit card account.

Once the new segments are created in central database 1300, card issuer 1200 filters customer responses received from response vehicle 1100. The filtering process determines whether a customer has accepted or declined the offers sent by card issuer 1200 (Step 316A). Card issuer 1200 generates notification messages for customers who have declined the extra credit offer, and sends the messages to response vehicle 110 for delivery to these customers. However, for customers who have accepted the offer, the appropriate segment(s) in the main table are activated (Step 318A). Activation of the segments provide available credit balances for each buckets associated with an activated segment.

In alternate aspect of the present invention, card issuer may decide to activate all new segments in database 1300 for each customer in the target customer group, prior to processing the responses. According to this aspect of the invention, credit card issuer 1200 activates the new segments when they are created (Step 312A). Then, customers who have accepted the offers are filtered (Step 314A). After filtering, the process is directed to Step 320A described later. This alternate process may reduce processing time by eliminating the activation step when a response is received by a customer. However, by activating the segments prior to the filtering process, customers who have declined the offers will have activated segments. In this scenario, these customers will simply not be notified of the active buckets. A modification to this aspect of the invention may include using the results of the filtering process to deactivate all segments for customers who have declined the offers. Deactivation may be performed immediately, or at a later time such as when an expiration date is reached.

After filtering and activation, card issuer 1200 may determine whether it is implementing a customer profile option (Step 320A). Customer profiles may be used by card issuer 1200 to obtain information related to a customer's interests. Profiles may be generated based on a variety of information, including past purchases, visited web sites and surveys. Customer profiles may also include demographic information collected from a variety of sources, such as Internet related sources. This may be performed by retrieving user identification information associated with a customer requesting selected web pages, using techniques well known in the art, such as cookies, and checking the identification information against a user profile resource. This process allows the customer, or a group of customers, to be associated with particular social, economic, educational and/or commercial interests. The process of utilizing customer or group profiles for classifying customers for target marketing is well known in the art, and the present invention can implement any number of these techniques. If it is determined that customer profiles are being used by card issuer 1200 (Step 320A; YES), the profile for a selected customer is accessed (Step 322A). Along with profiles, card issuer 1200 may also control whether the customer has a choice in selecting vendors for their extra line(s) of credit (Step 324A). If card issuer 1200 denies selections by customers, the appropriate vendor groups may be selected automatically, based on the customer's profile (Step 326A). This option, although limiting for the customer, has great versatility for the credit card issuer 1200.

This versatility enables card issuer 1200 to provide a variety of regulated options for its customers, based on their profiles. For example, a customer who is a college student may have a profile that indicates not only personal interests but also the school attended by the customer. Card issuer 1200 may offer this customer extra credit lines that are strictly associated with the college or university attended by the customer. Card issuer 1200 may authorize transactions on a selected bucket only at vendor sites located at or near the university. These sites may include university operated bookstores, campus restaurants and other vendor sites that may be found on or near the college campus. This option gives student customers an incentive to accept the card issuer's offer, while at the same time allowing credit card issuer 1200 to offer extra buckets to what statistically may be a group of high risk customers. Card issuer 1200 may also limit a single vendor to a credit line, as in the above example, or group several vendors into vendor groups. These groups may be authorized for use with selected credit lines added to a customer's card.

Vendor groups may be created in a number of different ways. One such way may be to categorize vendors based on related goods or services that are offered. Examples of categories may include athletics, outdoor activities (fishing, camping, etc.), travel, music and electronics. Broader categories such as those directly associated with department stores and gas stations may be used as well. Card issuer 1200 may create predetermined vendor groups including vendors that offer goods and/or services related to the group. The created vendor groups may then be selected for a customer based on the customer's profile. Therefore, for a customer who has a profile that associates them with music, a vendor group that includes merchants that offer goods and/or services associated with music may be associated with the customer's newly created line of credit. Additionally, considering the previous example with the college student, card issuer 1200 may provide a vendor group including the college's merchants, as well as merchants that provide groceries, such as selected supermarkets. As can be seen, a number of options are available to card issuer 1200 for selecting vendors for target customers.

Once credit card issuer 1200 has selected the appropriate vendor to be associated the customer's new bucket(s), they may be added to a vendor table that is unique to the customer (Step 328A). Vendor tables enable card issuer 1200 to track which vendors are associated with a particular customer. Card issuer 1200 maintains a master list stored in a vendor table corresponding to the issuer. The master list includes all vendors that have a partnership agreement with card issuer 1200. The partnership enables customer's of card issuer 1200 to use the extra lines of credit at sites associated with these vendors, provided the customer is authorized to purchase goods and services at these sites. Vendor tables may be stored in database 1300, or may be stored remotely. Thus, as can be seen, the invention can provide card issuer 1200 strategic control over the types of vendors associated with a customer's new credit lines. Once each selected vendor is added to the customer's vendor table, processing is forwarded to Step 348A, described later.

Although maintaining a customer's vendor selections may give strategic control to a card issuer, in order to promote use of the extra credit lines, customer-controlled, vendor selection may also be provided. Converse to having total control over a customer's vendor selection, a card issuer may allow customer input in choosing vendors. If this is the case, the customer may be presented with an option to select vendors (Step 330A).

The process of presenting vendor options to a customer is based on the medium the customer is communicating with credit card issuer 1200. Response vehicle system 1100 processes vendor option presentation information from credit card issuer 1200, and forwards them to the customers through communications channel 1400. For instance, customer 1010 may be presented with a web page including the vendor selection options. Response vehicle 1110 would send the page to customer 1010 after receiving the appropriate vendor information from credit card issuer 1200. Additionally, if a customer is communicating with credit card issuer 1200 through convention telephonic channels, response vehicle 1120 would present the vendor options to customer 1020 using standard telephone techniques.

If the customer decides not to participate in the vendor selections (Step 332A; NO), card issuer may select the vendors for the customer based on the customer's profile (Step 326A). On the other hand, card issuer 1200 may also apply each vendor in the master list to the customer's vendor table, (Step 346A), enabling the customer full access to all participating vendors. If the customer decides to participate in vendor selections (Step 332A; YES), card issuer may offer the customer selected vendor groups for selection (Step 334A). Using this option, although the customer is selecting vendors, the card issuer still maintains some control over vendor selections based on the vendor groups it offers to the customer. For example, if card issuer 1200 determines that a customer has a higher credit risk than other profiled customers, the vendor groups offered to the high risk customer may not include vendors that are offered to the lower risk customers. Vendor groups may be categorized for different customer risk profiles depending on various factors, including the type or average cost of goods and services offered by the vendors. This option enables credit card issuer 1200 to control vendor relationships with selected customers while still providing options to the customer. Once the selections are made by the customer, they are processed such that the selected vendors in the selected vendor groups are added to the customer's vendor table (Step 336A). Processing then continues to Step 348A, described later.

Referring back to Step 320A, in the event card issuer 1200 does not implement customer profiles, (Step 320A; No), customers may still have the option to participate in vendor selections. If card issuer 1200 supports this option (Step 338A; YES), the customer is presented with the entire master list of vendors in partnership with card issuer 1200 (Step 340A). A customer may select from the list and the selections are appropriately added to the customer's vendor table (Steps 342A and 344A). Processing is then forwarded to Step 348A. However, in the event card issuer does not support customer input for vendor selections (Step 338A; NO), every vendor in the master list is added to the customer's vendor table (Step 346A), and processing is passed to Step 348A.

Once credit card issuer 1200 has received and processed all the responses from the customers regarding vendors and acceptance of the extra credit line, notification messages are generated (Step 348A). As indicated before, the notification messages are passed to the customer's through the appropriate response vehicle and indicate to the customers that their extra credit line is now available. The notifications may indicate to the customers the available balance, the vendors associated with each new credit line, as well as other known credit card information.

It should be noted that although the steps illustrated in FIG. 3A may be related to those customer categories where the customer may respond immediately to offers, the steps may be applied to the other customer categories as well. That is, for conventional mail customers, the offers presented in the mail product from issuer 1200 may include predetermined vendor groups that the customer may select. Alternatively, the offer may designate vendors for the extra credit line(s). Accordingly, when the customer accepts the offer, either the predetermined vendor selections made by issuer 1200 would be activated or the selections indicated in the customer's response would be activated.

Figure 3C:
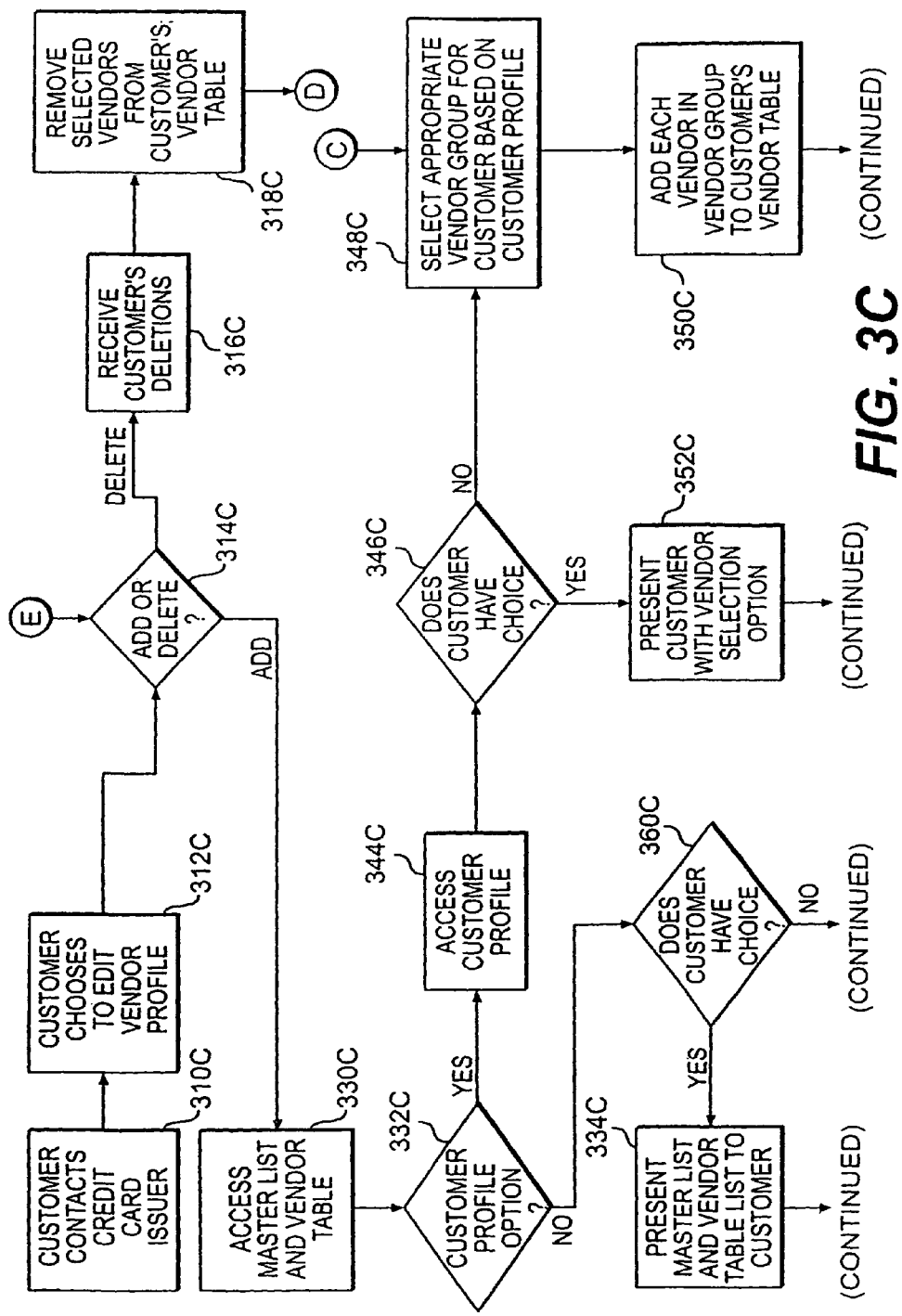
FIG. 3C is an exemplary flowchart for processing edits to a customer's vendor profile, in accordance with the present invention.
Figure 3C:
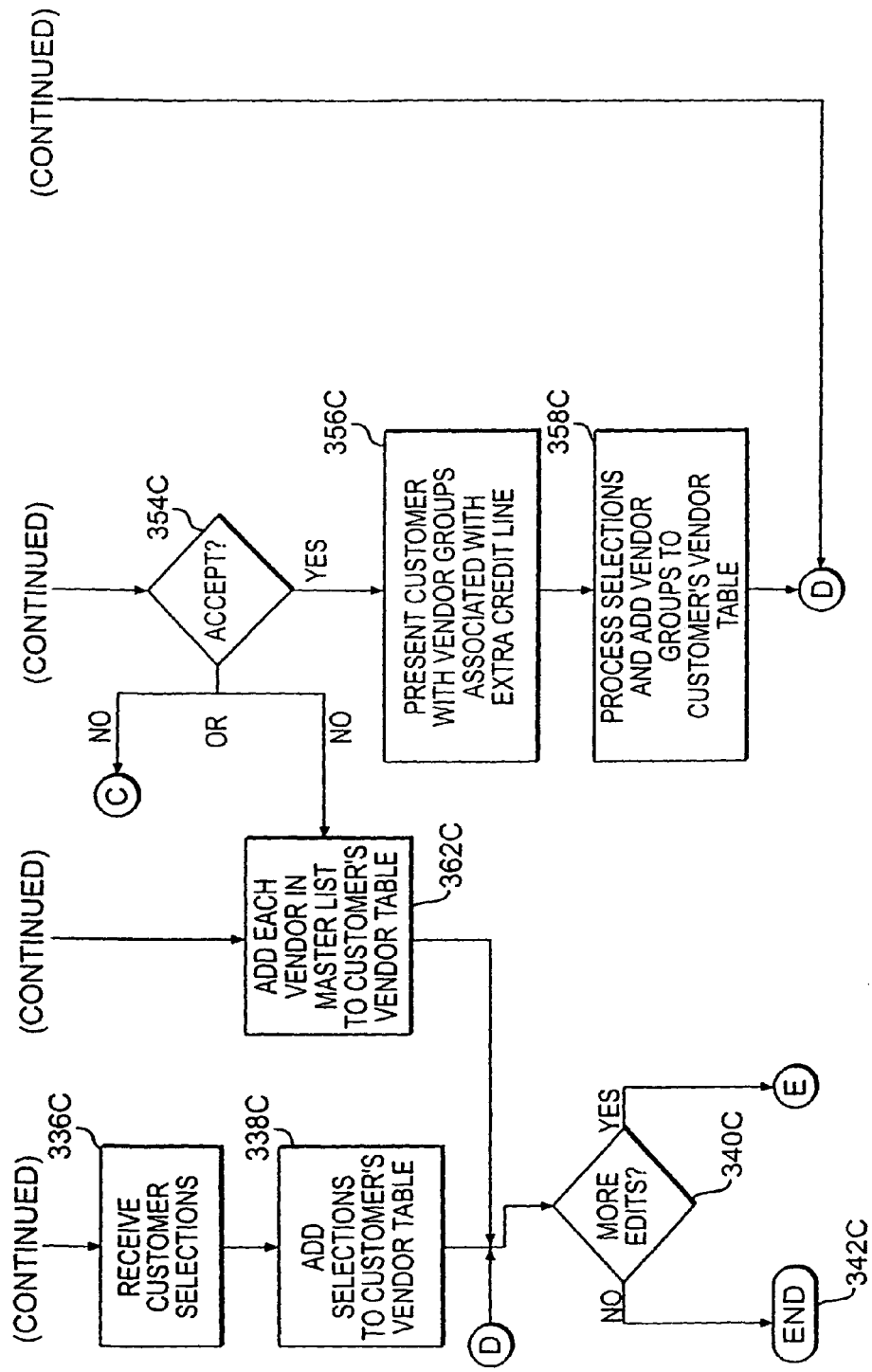

In addition to associating one or more vendors to one or more extra lines of credit when these credit lines are established, features of the present invention enable a customer to dynamically edit the vendor profile associated with their credit card account. FIG. 3C illustrates an exemplary process for editing a vendor profile for a customer's extra credit line(s). Once extra credit line(s) are established for a customer's credit card account, the customer may edit the vendor(s) associated with these credit lines. To edit a vendor profile, a customer contacts the credit card issuer 1200 through the appropriate response vehicle associated with the medium the customer chooses to use (i.e., website, email, telephone, etc.) (Step 310C). From there, the customer indicates to the credit card issuer 1200 that they wish to edit their vendor group profile (Step 312C). The customer may then indicate whether they want to add or delete vendors to/from the vendor profile (Step 314C). If the customer decides to delete vendors their vendor profile (Step 314C; DELETE), the customer may be queried to select the vendor(s) they want removed. This removal process may be performed in a number of different manners. One way would be for credit card issuer 1200 to provide the list of vendor(s) associated with a customer's designated extra credit line. The customer may then select specific vendors to be removed from the list. Alternately, the customer may simply provide to credit card issuer 1200 the vendor(s) when want removed from their vendor profile. Once credit card issuer 1200 receives the vendor(s) the customer selected from removal (Step 316C), credit card issuer 1200 delete these selected vendors from the vendor table associated with the designated extra credit line (Step 318C). From there, the customer may be queried whether there are any more changes they wish to make to their vendor profile (Step 340C). If not (Step 340C; NO), processing ends (Step 342C). However, if the customer decides to make additional changes (Step 340C; YES), the edit process is looped back to Step 314C for further processing.

Returning to Step 314C, if the customer decides to add vendor(s) to a selected extra credit line (Step 314C; ADD), credit card issuer 1200 accesses the master vendor list and the vendor table associated with the customer (Step 330C). Once the vendor information is accessed, credit card issuer 1200 determines whether a customer profile option has been implemented (Step 332C). In the event card issuer 1200 does not implement customer profiles, (Step 332C; NO), the customer may still have the option to participate in vendor selections. If card issuer 1200 supports this option (Step 360C; YES), the customer is presented with the entire master list of vendors in partnership with card issuer 1200 (Step 334C). The customer may select from the list of vendors and the selections are appropriately added to the customer's vendor table (Steps 336C and 338C). Processing is then forwarded to Step 340C to determine whether the customer wishes to make more changes to their vendor profile. However, in the event card issuer does not support customer input for vendor selections (Step 360C; NO), every vendor in the master list is added to the customer's vendor table (Step 362C), and processing is passed to Step 340C.

Referring back to Step 332C, if it is determined that customer profiles are being used by card issuer 1200 (Step 332C; YES), the profile for the customer is accessed (Step 344C). Along with profiles, card issuer 1200 may also control whether the customer has a choice in selecting vendors for their extra line(s) of credit during the editing process (Step 346C). If card issuer 1200 denies selections by customers, the appropriate vendor groups may be selected automatically, based on the customer's profile (Step 348C). Once credit card issuer 1200 has selected the appropriate vendor to be associated the customer's designated extra credit line(s), they may be added to the customer's vendor table (Step 350C). Accordingly, a customer may allow credit card issuer 1200 to automatically update their vendor profile, thus ensuring any vendors that have been approved for the customer's extra credit line(s), based on the customer's profile, are added to the customer's vendor profile. Of course, credit card issuer may also modify a customer's vendor profile without customer interaction. In another aspect of the present invention, credit card issuer 1200 may periodically perform credit worthiness checks on a customer's credit card account, and based on these worthiness checks, vendors may be added or deleted from a customer's vendor profile associated with the extra line(s) of credit. The customers may be notified of the changes to their vendor profiles through the various mediums supported by the response vehicle 1100. Once the selected vendor(s) are added to a customer's vendor table, processing is directed to Step 340C to determine if the customer wishes to make more changes to their vendor profile.

Returning back to Step 346C, in the event credit card issuer 1200 does allow customer input in choosing vendors (Step 346C; YES), the customer may be presented with an option to select vendors from the master list or designated vendor groups presented based on the customer's profile information (Step 352C). The process of presenting vendor options to a customer is similar to the features described with reference to the process shown in FIG. 3A.

If the customer decides not to participate in the vendor selections (Step 354C; NO), card issuer may select the vendors for the customer based on the customer's profile (Step 348C). On the other hand, card issuer 1200 may also apply each vendor in the master list to the customer's vendor table, (Step 362C), enabling the customer full access to all participating vendors. If the customer decides to participate in vendor selections (Step 354C; YES), card issuer may offer the customer selected vendor groups for selection (Step 356C). Once the selections are made by the customer, they are processed such that the selected vendors in the selected vendor groups are added to the customer's vendor table (Step 358C). Once the appropriate vendors are added to the customer's vendor table, processing then continues to determine whether additional changes to the customer's vendor profile is requested (Step 340C).

Once credit card issuer 1200 has received and processed all the responses from the customer regarding the modification to their vendor profile, a notification message may be generated to indicate the respective changes to the customer. As discussed before, the notification message may be passed to the customer through an appropriate response vehicle. The notification may also indicate to the customer the available balance, the vendors associated with each extra credit line, as well as other known credit card information.

Figure 4:
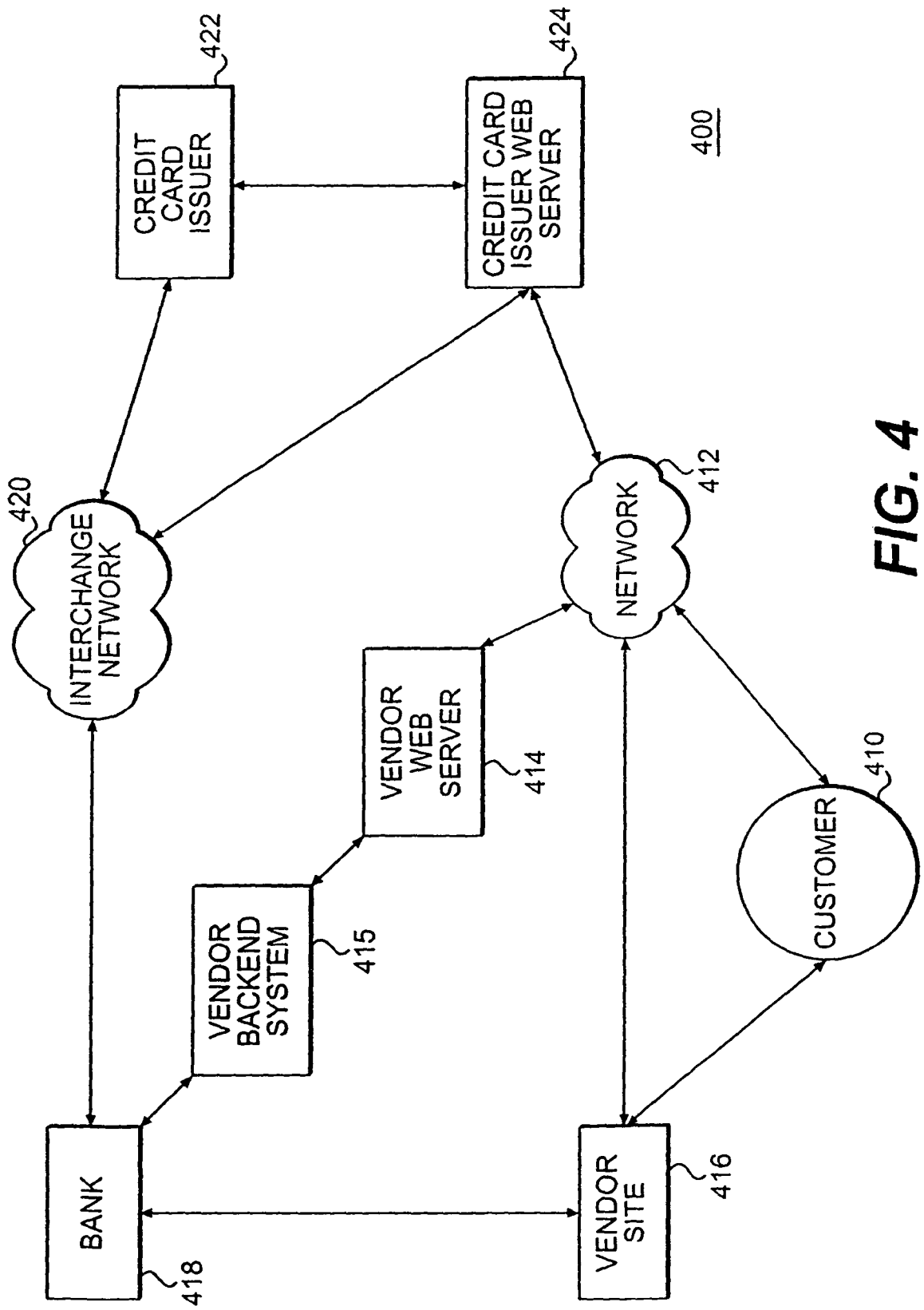
FIG. 4 is another exemplary system environment for providing a credit card with multiple lines of credit, in accordance with the present invention.

FIG. 4 illustrates another exemplary environment 400 in which features and principles of the present invention may be implemented. FIG. 4 may be implemented with a plurality of vendor sites and web servers, as well as a number of credit card issuers and associated web servers. Environment 400 includes customer 410, network 412, vendor web server 414, vendor backend system 415, vendor site 416, acquiring bank 418, interchange network 420, credit card issuer 422, and credit card issuer web server 424.

Network 412 may represent any known communication network that allows the exchange of information electronically. For example, network 412 may represent the Internet or a combination of local area networks or public networks connecting to the Internet.

Customer 410 may be a customer who has a credit card account with credit card issuer 422 or another credit card issuer. Customer 410 connects to network 412 with a personal computer (PC) or other device (e.g., wireless phone, PDS, thin client, etc.) to access web sites operated by web servers 414 and 424. Customer 410 may also be a customer who is physically at vendor Site 416 performing purchase transactions at a point of sale terminal.

Vendor site 416 may be a merchant's location, such as an outlet store, where customers purchase goods and/or services directly from the merchant. Vendor site 416 processes a large number of purchase transactions from a variety of customers, including customer 410. Vendor web server 414 operates a retail web site where customers may purchase goods and/or services offered by vendor 415 on-line through network 412. Vendor backend system 415 processes purchase transactions received at the vendor's web site from vendor web server 415, and forwards the transactions to acquiring bank 418.

Acquiring bank 418 may represent an institution that processes all financial transactions for vendor site 416 and web server 414. Acquiring bank 418 receives a great number of transactions from each of the vendor sites for a diverse group of customers. The customers may purchase goods and/or services using credit cards issued from different credit card issuers including credit card issuer 422. Acquiring bank forwards these credit card transactions to interchange network 420 for processing.

Interchange network 420 may be a commercially available interchange network, such as a VISA or MASTERCARD network. Interchange network 420 processes transaction information received from acquiring bank 418. Network 420 filters the transactions based on the type of credit cards used by customers initiating the transactions at vendor sites 416 and 414. Network 420 may also filter transactions originating from vendor sites that are accessed from card issuer 422's branded web sites. Interchange network 420 forwards the filtered transaction information to the appropriate credit card issuer, including credit card issuer 422.

Credit card issuer 422 issues credit cards to customers and maintains each customer's account. Card issuer 422 receives and authorizes transaction information from interchange network 420 and web server 424. Card issuer 422 also generates and presents offers for extra credit lines to specified customers.

Web server 424 operates web sites for issuer 422. The web sites includes retail sites from which customer 410 may purchase goods and/or services. Server 424 exchanges information with issuer 422 for processing these purchase transactions. Web server 424 may also process purchase transactions from customers who are not holders of credit cards issued by issuer 422. Web sites operated by web server 424 may include sites that offer goods and/or services directly from card issuer 422. These sites may also be sites that are operated by a vendor web server, but branded as a web site offered by card issuer 422.

Figure 5A:
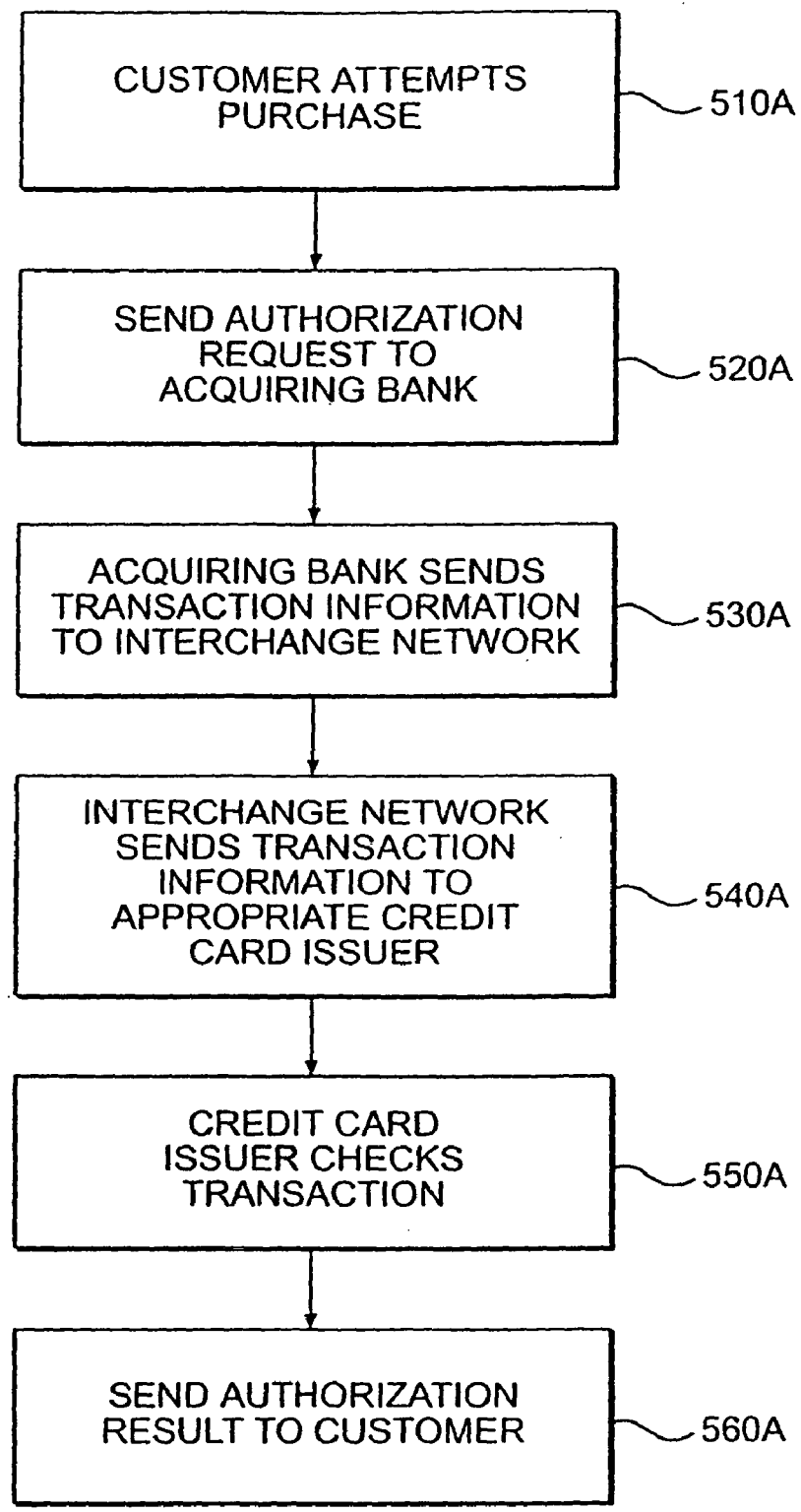
FIG. 5A is an exemplary flowchart for processing a purchase transaction, in accordance with the present invention.

FIG. 5A illustrates an exemplary process associated with authorizing a charge made by customer 410 in environment 400. The features of FIG. 5A may be implemented in connection with credit cards of the present invention, including multi-line credit cards and credit cards with embedded credit line(s). For purpose of illustration, FIG. 5A will be described below with reference to a credit card that is upgraded with an extra line of credit. FIG. 5, however, may also be implemented in connection with credit cards including credit cards with multiple lines of extra credit.

As illustrated in FIG. 5A, customer attempts a purchase transaction at either vendor site 416 or a web site operated by web servers 414 or 424 (Step 510A). If the transaction is at vendor site 416, the customer may present their credit card at a point of sale (POS) terminal to complete the purchase. Personnel at site 416 may process the credit card by "swiping" the credit card through a credit card processing instrument at the POS terminal. The POS terminal then generates transaction information specific to the attempted purchase, including the customer's credit card information. The POS terminal sends the transaction information to acquiring bank 418 through an electronic link (Step 520A). If the transaction is attempted at a web site, the customer would present their credit card information to web server 414, 424 using a web browser or another application. Web server 414 forwards the customer's credit card information, along with the purchase data, to backend system 415 for processing. Backend system 415 processes all purchase transactions received at web server 414. Web server 424 may similarly use a backend system (not shown) to perform similar operations. The transaction information, including the customer's credit card data, is packaged and may be sent to acquiring bank 418 for vendor based transactions. Transactions associated with web server 424 may also use similar acquiring banks (not shown) that would operate in a manner consistent with bank 418.

Acquiring bank 418 processes the transaction information and forwards it to interchange network 420 (Step 530A). Once received, interchange network 420 filters the transaction information from other transactions received from other vendor sites. The purchase transaction from customer 410 would be filtered and may be aggregated with other transactions involving credit cards issued from card issuer 422. Interchange network 420 then sends the transaction information to issuer 422 for authorization (Step 540A).

Credit card issuer 422 receives the transaction information, and determines whether the purchase should be authorized (Step 550A). Details regarding the authorization process is described with reference to the description of FIG. 5B. Card issuer 422 then sends the results of the authorization process back to interchange network for distribution to vendor sites 414, 416 or to web server 424 (Step 560). Vendor sites 414, 416 and server 424 either completes or denies the transaction based on the results of the authorization process.

Figure 5B:
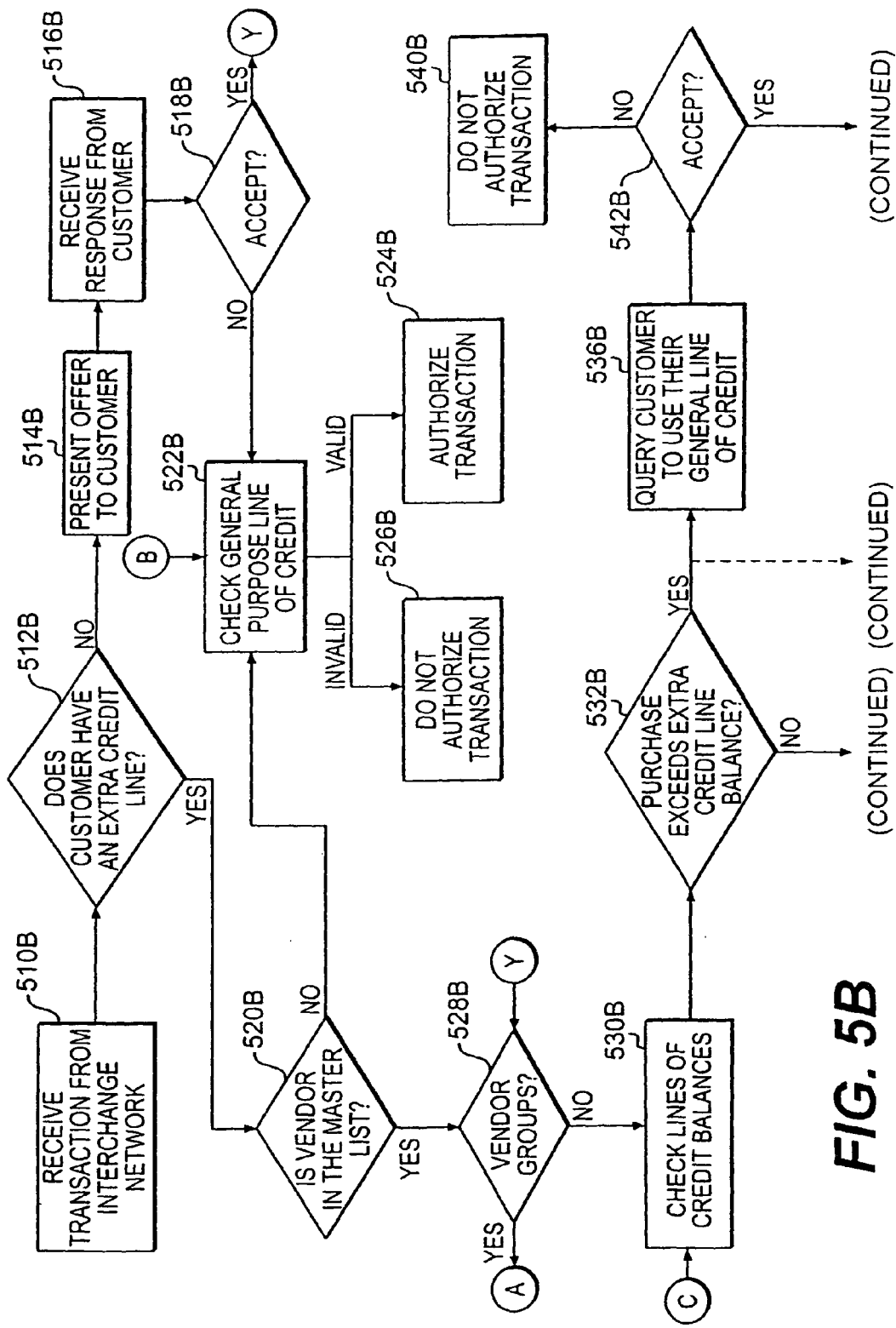
FIG. 5B is an exemplary flowchart for authorizing a purchase transaction, in accordance with the present invention.
Figure 5B:
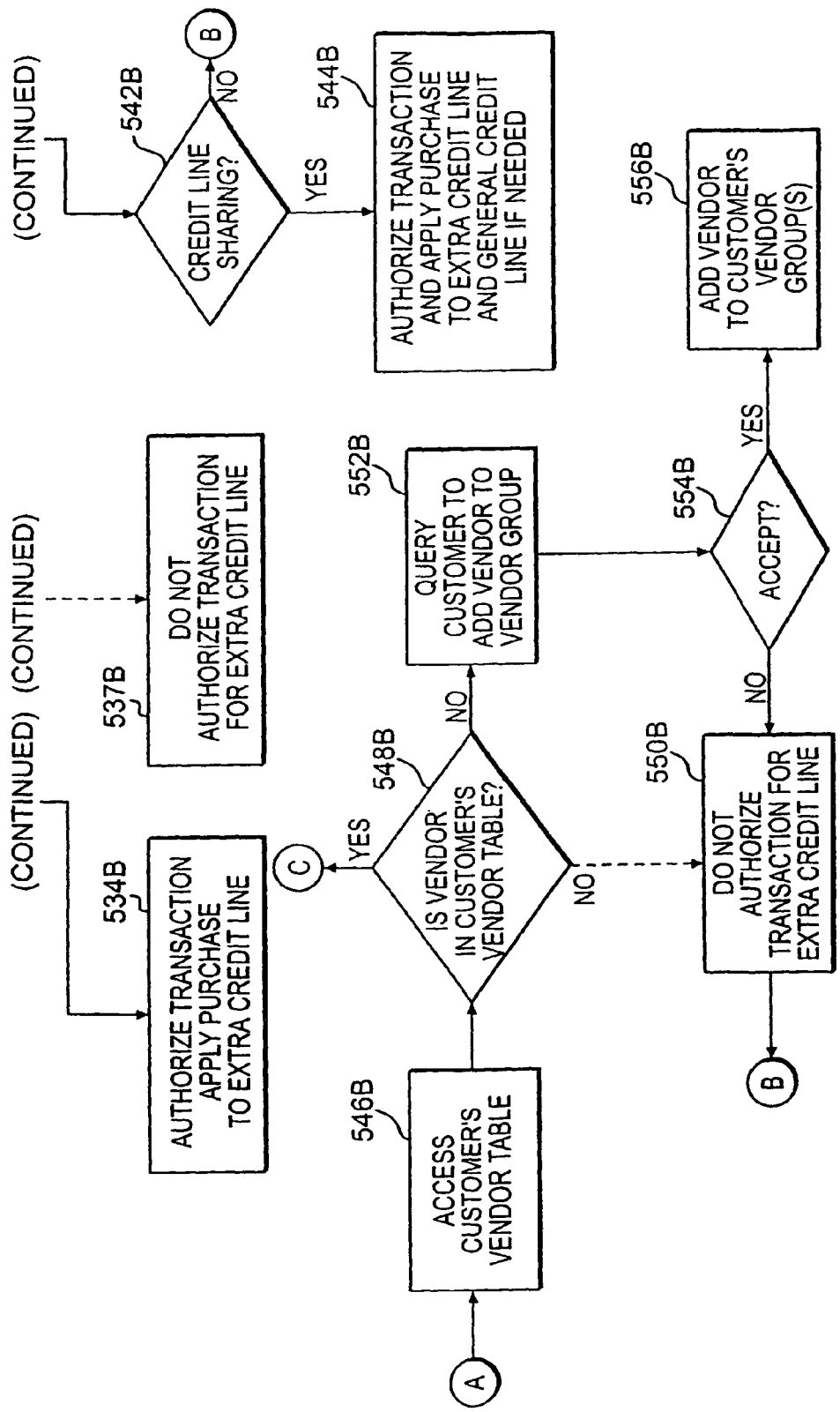

FIG. 5B illustrates an exemplary process associated with card issuer 422 checking the validity of the purchase transaction of customer 410. As shown in FIG. 5B, card issuer 422 receives transaction information associated with customer 410 from interchange network 420 (Step 510B). After performing well known security checks regarding the customer's account, (i.e., verifying the customer's account number), card issuer 422 then determines whether customer 410 has an extra line of credit (Step 512B). If it is determined that the customer does not have additional buckets associated with their account, processing is forwarded to step 514B.

At step 514B, card issuer 422 may generate an offer to customer 410, in accordance with features and principles of the present invention. At this point, card issuer 422 may provide an option to credit card holders to obtain extra credit on their existing card. Prior to presenting the offer to customer 410, credit card issuer 422 determines whether customer 410 is "eligible" for such benefits. The process may mimic the functions previously described with reference to FIG. 3A. If customer 410 is not eligible, no offer will be presented, and processing will continue at Step 522B. However, if the customer is determined to be eligible, an offer for extra credit is sent to the appropriate site for delivery to the customer. The manner in which the query may be presented to the customer may be based on the site accessed by customer 410. For instance, in the event customer 410 is located at a POS terminal at vendor site 416, the query may be presented by a clerk operating the POS terminal. Alternately, if the customer has accessed a web site to purchase goods, web servers 414 and 424 may present and process the customer's response-automatically.

Several options may be available to card issuer 422 in the event the customer is performing a transaction at vendor site 416. The message may be displayed at the clerk's POS terminal, flagging them to present the offer to customer 410. Upon receiving the customer's response, the clerk may select to notify card issuer 422 using the POS terminal. The clerk's notification may follow the normal channels of communications indicated in FIG. 4. Alternately, another option may be to direct the customer to the vendor's customer service desk or a kiosk computer located at the vendor's site. This option may be less obtrusive to customers waiting in lines at the vendor's POS terminals. The processing of the customer's decision to accept extra credit may be performed at these locations after the purchase has been completed. Another option may be to print the offer on a purchase receipt. The receipt may include a telephone number or URL that the customer may use to obtain extra credit line(s) for their existing card. As can be seen, a wide variety of options are available for card issuer to present its query to customer 410, and are not limited by the above examples.

In order to process and present the offer to a customer, the POS terminals may include the necessary software and hardware required for communicating with credit card issuer 422. For instance, the extra credit offer or message may be appended to a transaction authorization message issued by credit card issuer 422. The POS terminal would receive the information from credit card issuer 422 and filter the extra credit offer from the authorization message. The offer may subsequently be displayed on a terminal or it may be printed on a sales receipt, as indicated above.

Once the customer responds to the offer, the response is sent to issuer 422 (Step 516B). If the customer accepted the offer, the customer's account is modified to reflect the new credit lines in accordance to the principles of the invention. Processing is then forwarded to Step 528A. In the event customer 410 declined the offer, the purchase is checked for authorization against the customer's general purpose credit line (Step 522B).

However, in the event customer 410 does have extra lines of credit on their existing credit card, a check is made to determine whether the vendor associated with the transaction has a partnership agreement with card issuer 422 (Step 520B). The vendor associated with the transaction may be associated with a site that is accessed from card issuer's branded web site operated by server 424. In order to determine if the vendor is included in card issuer's master vendor list, vendor identification information included in the transaction information sent from interchange network 420 may be compared to those stored in card issuer's master vendor list.

In the event that the vendor is not included in the master vendor list (Step 520B; NO), issuer 422 may decide to apply the attempted purchase to customer 410's general purpose line of credit. In such a case, the general credit line is analyzed to determine whether the are sufficient funds to complete the transaction (Step 522B). If there are sufficient funds, credit card issuer 422 validates the transaction, applies the purchase amount to the balance of the customer's general purpose credit line and sends notification of the authorized transaction to interchange network 420 for delivery to the appropriate vendor site (Step 524B). However, if the purchase amount exceeds the available balance associated with customer 410's general line of credit, the transaction is not authorized (Step 526B). Notification of the unauthorized transaction is forwarded to interchange network 420 for delivery to the vendor site.

Referring back to step 520B, if it is determined that vendor site 416, 414 (or a vendor associated with a web site operated by server 424) is included in the vendor master list (Step 520B; YES), an analysis is performed to determine whether customer 410 has an extra credit line that is associated with vendor groups (Step 528B). If the vendor group option is associated with the customer's account, processing is forwarded to Step 546B, described later. If the customer's account is not associated with vendor groups (Step 528B; NO), card issuer 422 analyzes the customer's extra credit line(s) for vendor associations and balance amount(s) (Step 530B). This analysis may include determining whether the customer has more than one extra credit line and the association of the extra credit line(s) with the vendor. For example, if customer 410 has two extra credit lines, card issuer 422 may determine which bucket the purchase at site 414, 416 and 424, is to be applied. As indicated previously, for purposes of illustration of the process described in FIG. 5A, it is assumed that customer 410 has only one additional bucket associated with their credit card account.

Once analysis of the customer's account is complete, and card issuer 422 determines that the purchase amount does not exceed the available balance for the customer's extra credit line, the transaction is authorized (Steps 532B; NO and 534B). Credit card issuer 422 validates the transaction, applies the purchase amount to the customer's extra credit line balance and sends notification of the authorized transaction to interchange network 420 for notification to the appropriate vendor site. However, in the event the purchase amount exceeds extra credit line's available balance (Step 532B; YES), the customer may be queried to apply the purchase to their general purpose credit line (Step 536B). Alternately, card issuer 422 may deny authorization for the extra credit line, and automatically apply the purchase to the customer's general credit line (Step 537B). In the event the customer does not accept the offer to use their general credit line for the purchase (Step 538B; NO), the transaction is not authorized and notification is sent to interchange network 420 for appropriate delivery to the customer. But, if customer 410 accepts the offer to use their general credit line (Step 538B; YES), card issuer determines whether a credit line sharing option is activated for the customer's account (Step 542B). Credit line sharing may be an option offered to customers that allows purchases applied to one bucket to be shared by other buckets. This option is demonstrated with the example presented in Table I. In particular, Table I illustrates an exemplary scenario associated with customer 410 attempting to purchase goods at vendor site 416.

TABLE I

Example of Credit Line Sharing

| | Purchase Amount | $1^{st}$ Bucket Available Balance- General Purpose Credit Line | $2^{nd}$ Bucket Available Balance- Extra Credit Line |
|---|---|---|---|
| | $0 | $1000 | $100 |
| Option 1 | $200 | $800 | $100 |
| Option 2 | $200 | $900 | $0 |

The 1st bucket is associated with customer 410's general purpose credit line and the $2^{nd}$ bucket with an extra credit line implemented as a private label credit line associated with vendor site 416. In the example of Table I, customer 410 attempts to make a $200 purchase at vendor site 416. Option 1 illustrates the process where the credit line sharing option is not activated for customer 410. As shown, the $200 purchase is applied entirely to the $1^{st}$ bucket (reducing the available balance from $1000 to $800) leaving the $2^{nd}$ bucket's balance intact (at $100). Option 2 illustrates the process where the credit line sharing option is active and available to customer 410. In this option, the purchase amount is first applied to the $2^{nd}$ bucket's available balance, with any remaining amount then applied to the $1^{st}$ bucket. As shown, the $200 purchase is applied to the $2^{nd}$ bucket credit line, leaving $100 of the purchase to be covered by the $1^{st}$ bucket. As a result, the remaining balance for the customer's $1^{st}$ and $2^{nd}$ buckets is $900 and $0, respectively. As can be seen, the credit line sharing option allows credit card issuer 422 to offer customers versatility in the use of their credit card balances, while still maintain control over the customers' accounts. Card issuer 422 may selectively offer the sharing option to customers automatically, or elect to have customers decide whether they want to implement this option.

Therefore, if the credit line sharing option is activated (Step 542B; YES), the process associated with credit line sharing is performed (Step 544B): In the event the sharing option is not activated for customer 410 (step 542B; NO), the purchase is automatically applied to the customer's general purpose credit line or $1^{st}$ bucket (Step 522B).

Along with checking the authorization of transactions performed by customer 410, credit card issuer may allow interactive operations with customer 410 to take place during the transaction process. For example, card issuer 422 may allow customer 410 to edit their vendor group profile associated with their extra credit line. Steps 546B through 556B of FIG. 5B illustrates this option. Referring back to Step 528B, in the event customer 410 has vendor groups associated with their account (Step 528B; YES), credit card issuer access the vendor table associated with customer 410 (Step 546B). As previously described with reference to FIG. 3A, the customer's vendor table may be stored in a central database operated by card issuer 422. Card issuer 422 then determines whether vendor site 414, 416 or the vendor site associated with server 424, is included in the customer's vendor table (Step 548B). If the vendor is in the vendor table, processing may proceed to authorize the transaction for the customer's extra credit line (Steps 548B; YES, 530B). However, in the event the vendor is not in the customer's vendor table (Step 548B; NO), the customer may be queried to add the vendor to its vendor group (Step 552B). The manner in which the query may be presented to the customer may depend on the vendor site accessed by customer 410.

In particular, as previously indicated in the description of Step 514B, in the event customer 410 is located at a POS terminal at vendor site 416, the query may be presented by a clerk operating the POS terminal. Alternately, if the customer has accessed a web site to purchase goods, web servers 414 and 424 may present and process the customer's response automatically. The message may be displayed at the clerk's POS terminal, flagging them to present the question to customer 410. Upon receiving the customer's response, the clerk may notify card issuer 422 using the POS terminal. Alternately, the customer may be directed to the vendor's customer service desk or a local kiosk computer located at the vendor's site. The editing of the customer's vendor group table may be performed at these locations after the purchase has been completed. Another option may be to print the request on the purchase receipt. The receipt may include a telephone number or web site URL that the customer may use to edit their vendor group. As can be seen, a wide variety of options are available for card issuer to present its query to customer 410, and are not limited by the above examples.

Referring back to Step 552B, if customer 410 accepted the option to edit their vendor group table, (Step 554B; YES), vendor 414, 416 or the vendor associated with server 424, is added to the customer's vendor table (Step 556B). Processing is then forwarded back to Step 530B to continue the authorization process.

Allowing a customer to edit their vendor groups may be an option that customers and card issuer 422 decide to implement. However, the security of activated vendor groups may be an area of concern for card issuer 422 and customers alike. Therefore, the dynamic editing of vendor groups may be removed by merely bypassing the query process, and automatically denying transactions with vendors that are not included in a customer's vendor group (Step 550B).

As described, the present invention allows customer's who access vendor sites physically or through other channels, such as the Internet, the versatility of using their extra credit lines, as well as have existing credit cards modified to include additional lines of credit.

Credit card issuer 422 may operate their own web sites for the sales of goods and/or services. The card issuer's web sites may be financial based sites that offer the credit cards and other financial services. Additionally, these sites may provide goods and/or services from vendors either directly or through a vendor operated site that is branded as a card issuer's site. Allowing card holders to purchase goods and/or services through a card issuer's branded web site may present a safer environment for on-line purchasing. That is, card issuers may target and offer extra credit lines to groups of customers who are hesitant to purchase goods and/or services on-line for security reasons. These customers may have a concern that their credit card numbers may be stolen by unauthorized individuals who eavesdrop such transactions. A card issuer that operates its own branded sales site may appeal to these hesitant customers. A customer may feel more secure in purchasing such goods and/or services from a site that is operated by the credit card issuer that has issued the credit cards that they hold.

There are a variety of ways card issuers can process transactions occurring at card issuer branded web sites. Transactions from customers who access a web site operated by card issuer web server 424 may be processed in the same manner as described in FIGS. 5A and 5B. Additionally, other methods and environments may be implemented.

FIG. 6 illustrates an exemplary environment 600 in which purchase transactions from extra credit card holders may be implemented, in accordance with another aspect of the present invention. Environment 600 includes a customer 610, web server 612, credit card issuer's web site product database 618, customer registration database 616, credit card issuer's management information system (MIS) 620, secondary web server 622, secondary backend system 624, master product database 626, vendor/manufacturer site 628, interchange network 630, credit card issuer authorization system 632 and credit card issuer bucket system 634.

Customer 610 represents a customer who may use a personal computer (PC) or other device (e.g., wireless phone, PDA, thin client, etc.) computer system with a network interface to access a web site operated by web server 612 through the Internet (not shown). Customer 610 may hold an existing credit card issued from a credit card issuer or issued from another credit card issuer.

Web server 612 operates a web site that offers good and/or services to customers for purposes of illustration, the web site may include a branded web site that include logos and identifying features of the credit card issuer. The web site may include, but is not limited to, a home page that include links to web pages that offer goods and/or services to customers. In accordance with one aspect of the invention, web server 610 is maintained and controlled through a secondary web server 622 that brands the web site as a credit card issuer web site.

Customer registration database 616 includes customer information related to credit card accounts, including extra credit lines added to each customer's existing credit card account. Web site product database 618 includes information related to the types of goods and/or service offered by the credit card issuer, at the web site operated by server 612.

Management information system (MIS) 620 processes the information stored in database 616, including extra credit line account numbers. MIS system 620 also performs an offer decisioning process, such as that described with reference to FIG. 7A.

Secondary web server 622 may be a server that manages the operations performed by server 612. This includes the management of the types of information displayed at the web site and the exchange process of orders received at the site. Secondary backend system 624 processes received orders, creates authorization requests and receives results of the authorization requests, billing functions and customer service operations. Backend system forwards the selected information to an appropriate entity it has a link to. For instance, customer service transactions could be forwarded to entities that are designed to handle such transactions.

Master product database 626 receives updates on product information and uploads it to server 612. Vendor/manufacturer site 628 receives processed orders from secondary backend system 624. Site 628 fills the orders and ship goods that customer 610 may have ordered from web server 612.

Interchange network 630 receives authorization requests from secondary backend system 630, and filters the request based on the type of credit card used to purchase orders at the web site operated by server 612. Network 630 sends requests associated with customers using credit cards issued by credit card issuer to authorization system 632. System 632 performs transaction authorization operations for the credit card issuer, including extra credit line authorizations. Credit card issuer bucket system 634 performs account settlement functions associated with the orders processed by backend system 624.

Details of the features and operations of the elements illustrated in FIG. 6 will be described with reference to FIGS. 7A and 7B.

Figure 7A:
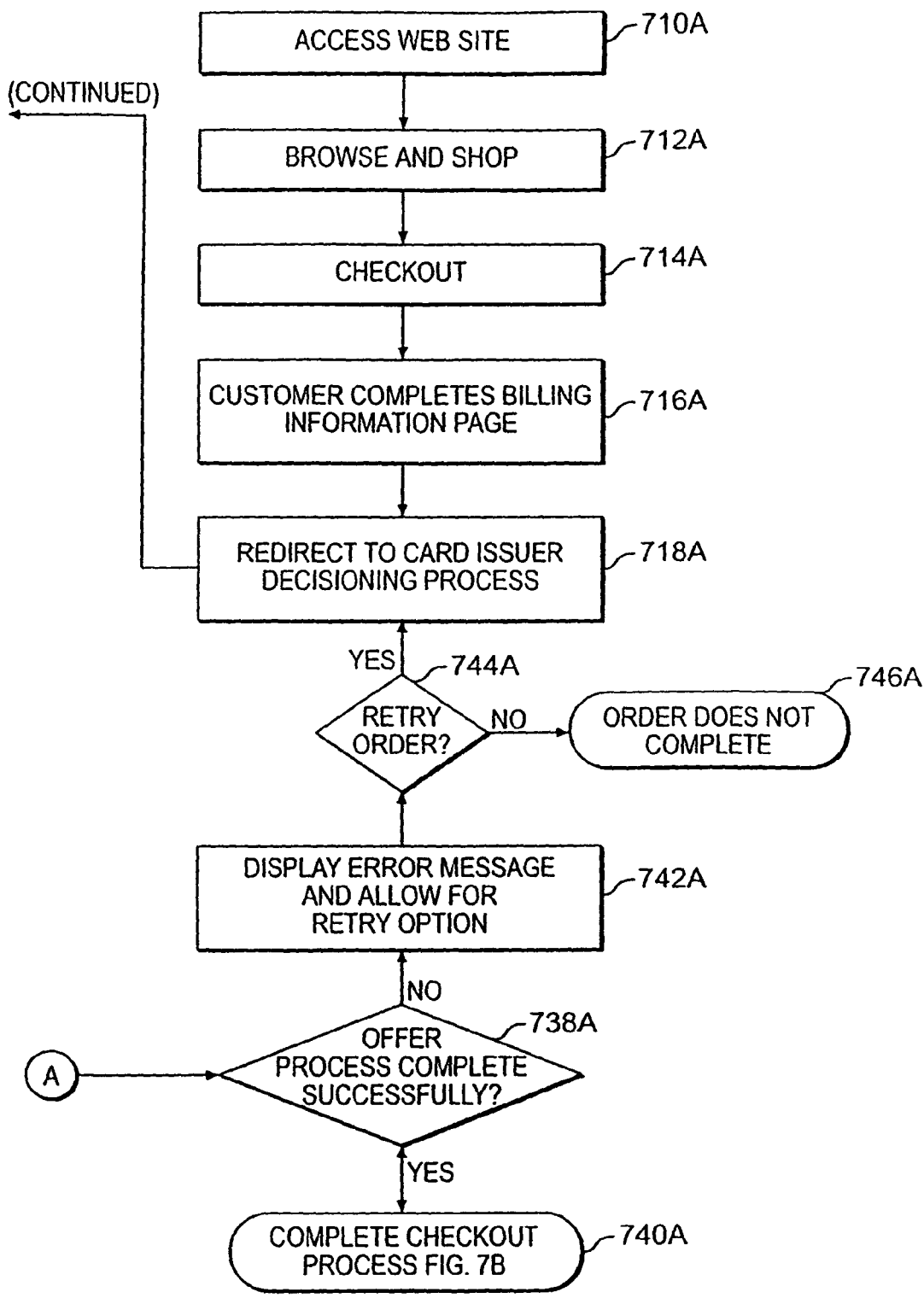
FIGS. 7A and 7B are exemplary flowcharts for processing a purchase transaction in the exemplary environment shown in FIG. 6, in accordance with the present invention.
Figure 7A:
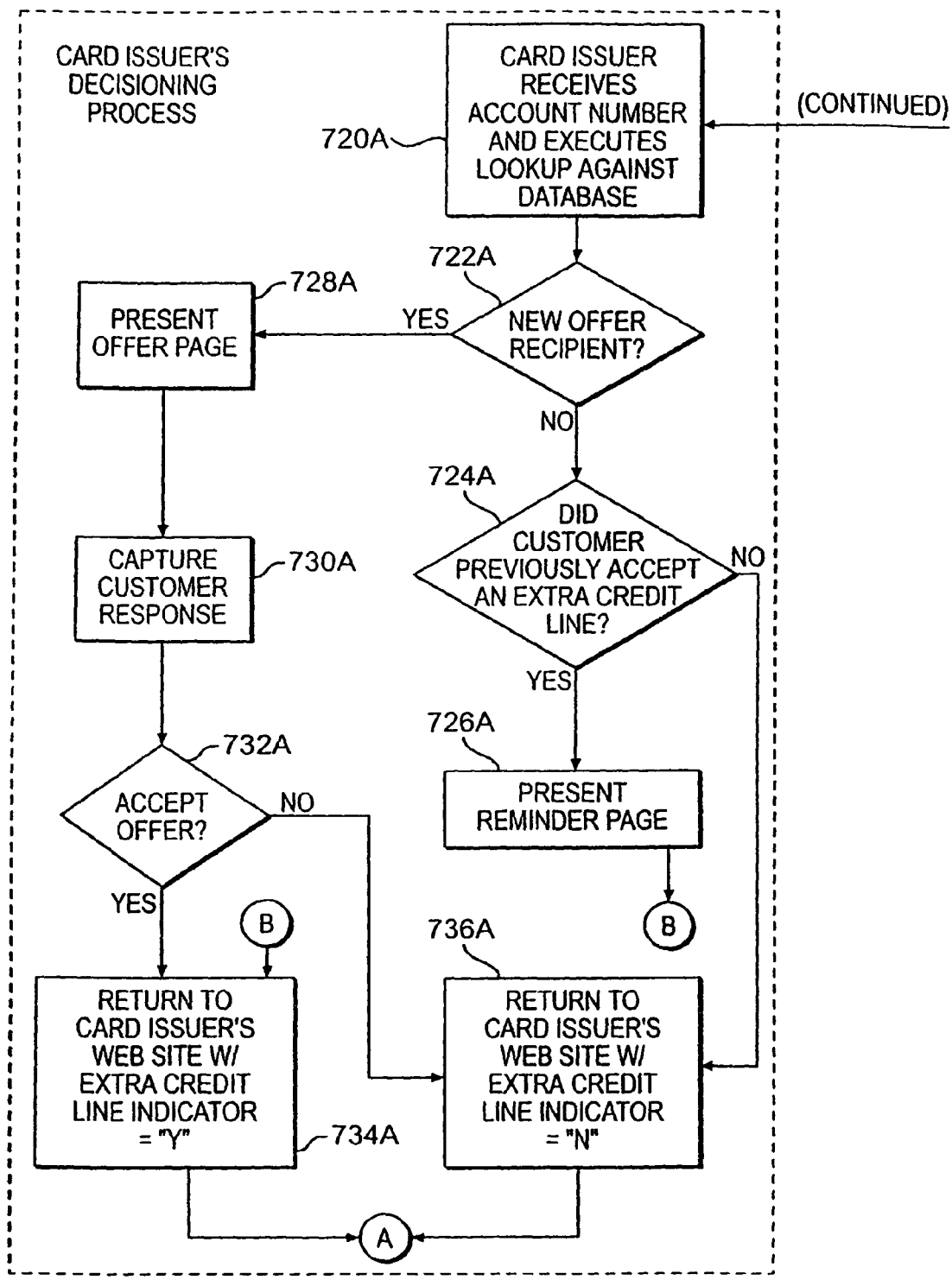

FIG. 7A illustrates an exemplary process associated with a purchase transaction attempted at a web site branded by a credit card issuer. The branded web site may target customers who have an extra credit line added to their existing credit cards issued by the credit card issuer. However, the goods and/or services offered at the web site may be purchased by customers using a variety of different credit cards, including cards not issued by the card issuer hosting the site. A customer may be attracted to the branded web site by offers for extra lines of credit generated by a credit card issuer.

FIG. 7C shows an exemplary offer 710C for an extra line of credit. Offer 710C represents an offer that may be sent to a customer using conventional mail techniques or by other communication techniques, such as email. Similar offers may also be presented through a banner advertisement or web page. The offer 710C may instruct the customer to visit the credit card issuer's branded web site to obtain an extra line of credit. The offer may also include the amount of credit that is available to the customer. As shown in the exemplary offer of FIG. 7C, the customer is offered an extra line of credit of $250.00. The offer 710C may also indicate to the customer that the extra line of credit is restricted to purchases from the credit card issuer's branded web site. However, as described previously, the extra line of credit may also be associated with a plurality of vendors or vendor groups. The offer illustrated in FIG. 7C is exemplary, and should not be considered limiting. Any number of offers may be presented, with various terms and conditions associated with the extra line of credit offered to the customer. For instance, the offer 710C may be adjusted seasonally. That is, the terms and conditions associated with offer 710C may be based on a holiday season, such as Christmas. The $250.00 extra line of credit offered to the customer in offer 710C may be reduced after the holiday season. Accordingly, credit card issuers may vary their offers based not only on a customer's credit worthiness, but the time of year as well. A number of factors other than the time of year may also contribute to the adjustment of an offer and are not limited to those described above.

Referring again to FIG. 7A, the process begins when customer 610 access the web site using standard network accessing techniques (Step 710A). For instance, customer 610 may access the web site by entering a selected URL with their local browser. Additionally, customer 610 may have selected a link that was presented at another web page previously viewed by the customer. The customer may then browse the web site, selecting items and links that may direct the customer to other web pages that offer selected goods and/or services for purchase (Step 712A). As the customer browses and shops at the web site, they may select goods that are added to a virtual shopping cart. The virtual shopping cart acts as a normal supermarket shopping cart, whereby goods off shelves are held while shopping. The customer may remove items from the virtual shopping cart just as if they were shopping at a physical vendor site. Features of the virtual shopping cart may include a running tally of total purchases in the shopping cart. Also, individual items in the cart may be reviewed at the customer's leisure. A customer may-save the shopping cart, such that in the event the customer leaves the web site without purchasing any goods and/or services, the items in the cart will remain until the site is again visited by the customer.

Once the customer has completed shopping at the web site, the customer may decide to check out. The customer may select an icon or button bar that initiates the check out process. (Step 714A). A billing information page is then presented to the customer, where credit card information is requested. For this example, the customer may hold a credit card issued by the credit card issuer branded at the web site. The customer enters the appropriate billing information (Step 716A), including their credit card data and attempts to complete the transaction by selecting an appropriate icon or button bar.

Server 612 recognizes the customer's request to complete the transaction and redirects processing to a credit card issuer offer decision processes (Step 718A). The offer decisioning process may be performed at credit card issuer management information system 620 or at other credit card issuer systems that have access to customer account information. The session with customer 610 and server 612 is maintained while the decisoning process is performed. Once management information system receives the appropriate credit card information, it analyzes the card information against data stored in customer registration database 616 (Step 720A). Based on the analysis, system 620 determines whether the customer has previously been offered an extra credit line through the credit card issuer's branded web site (Step 722A). This may be determined by server 612 maintaining information in database 616 regarding which customers were presented a selected page including the extra credit offer from the credit card issuer.

In the event the customer has received the offer previously (Step 722A; NO), system 620 determines whether the customer accepted any extra credit lines presented in the previous offer (Step 724A). In the event the customer did accept the offer (Step 724A; YES), a reminder message is presented the customer indicating that their extra credit line would be used for the attempted purchase. Processing is then forwarded to Step 734A, described later. However, if the customer did not accept the offer (Step 724A; NO), an extra credit line indicator is set to "N", and processing is directed back to the web site operated by server 612 (Step 736A).

Referring back to Step 724A, in the event the customer has not been offered an extra credit line, (Step 722A; YES), an extra credit line offer page is generated and presented to the customer (Step 728A). The offer may be generated based on the features previously described herein. The offers may also be generic and directed to all customers of the card issuer hosting the web site. Additionally, the offers may be tailored for customers who are not holders of credit cards issued by the card issuer hosting the web site. The offer may allow the credit card issuer to obtain new customers by advertising the benefits of owning a credit card with multiple lines of credit. If the customer is not a holder of a credit card issued by the card issuer, the customer would be issued a new card with multiple lines of credit or a new card with a general purpose credit line and the option to add extra lines of credit at a later time.

FIG. 7D shows an exemplary web page including an offer 710D for an extra line of credit. Offer 710D represents an offer that may be presented to a customer shopping at the credit card issuer's branded web site. As shown in FIG. 7D, the offer may include the amount of credit that is available to the customer, as well as the terms and conditions of the extra credit line. This may include interest rate information, activation fees and minimum payment information (not shown). The offer may instruct the customer to select an icon or button bar to accept the terms and conditions of the offer for an extra credit line. The offer 710D may also indicate to the customer that the extra line of credit is restricted to purchases from the credit card issuer's branded web site. The offer illustrated in FIG. 7D is exemplary and should not be considered limiting. Any number of offers may be presented, with various terms and conditions associated with the extra line of credit offered to the customer. Additionally, the graphically representation of the offer is not limited to that shown in FIG. 7D. Of course, any number of graphical and textual variations to the offer 710D may be chosen by a credit card issuer and presented in the offer web page.

Once the customer's response to the offer is captured (Step 720A), system 620 determines whether the customer accepted the offer or not (Step 732A). In the event the customer declined the offer, an extra credit line indicator is set to "N", and processing is redirected back to the web site operated by server 612 (Step 736A). However, if the customer did accept the offer (Step 732A; YES), the extra credit line indicator is set to "Y", and processing is directed back to the web site operated by server 612 (Step 734A).

Processing of a customer's acceptance to include an additional line of credit on an existing credit card may be processed a plurality of ways. For example, the extra credit line indicator being set to "Y" may initiate an updating operation at credit card issuer bucket system 634. System 634 may update a central database in order to edit the customer's account to include an additional bucket for the extra line of credit. This process may be implemented by using additional segments in a central database, similar to the process previously described with reference to FIG. 3A. Once updated, authorization system 632 and management information system 620 are updated with the new account information. Once the customer's account is updated with the new bucket, processing is then directed to the web site hosted by the credit card issuer.

Once the web site receives the information from management information system 620, it determines if the offer was successfully completed (Step 738A). In the event the offer was not successfully completed (Step 738A; NO), an error message is displayed to the customer and a retry option is presented (Step 742A). If the customer decides not to retry the order (Step 744A; NO), the order is not completed and the purchase transaction is ended (Step 746A). However, if the customer decides to retry the order (Step 744A; YES), processing is forward back to Step 718A for another attempt at processing the order.

Referring back to Step 738A, in the event the offer process did complete successfully (Step 738A; YES), a check out process is initiated, such as that described below with reference to FIG. 7B.

Figure 7B:
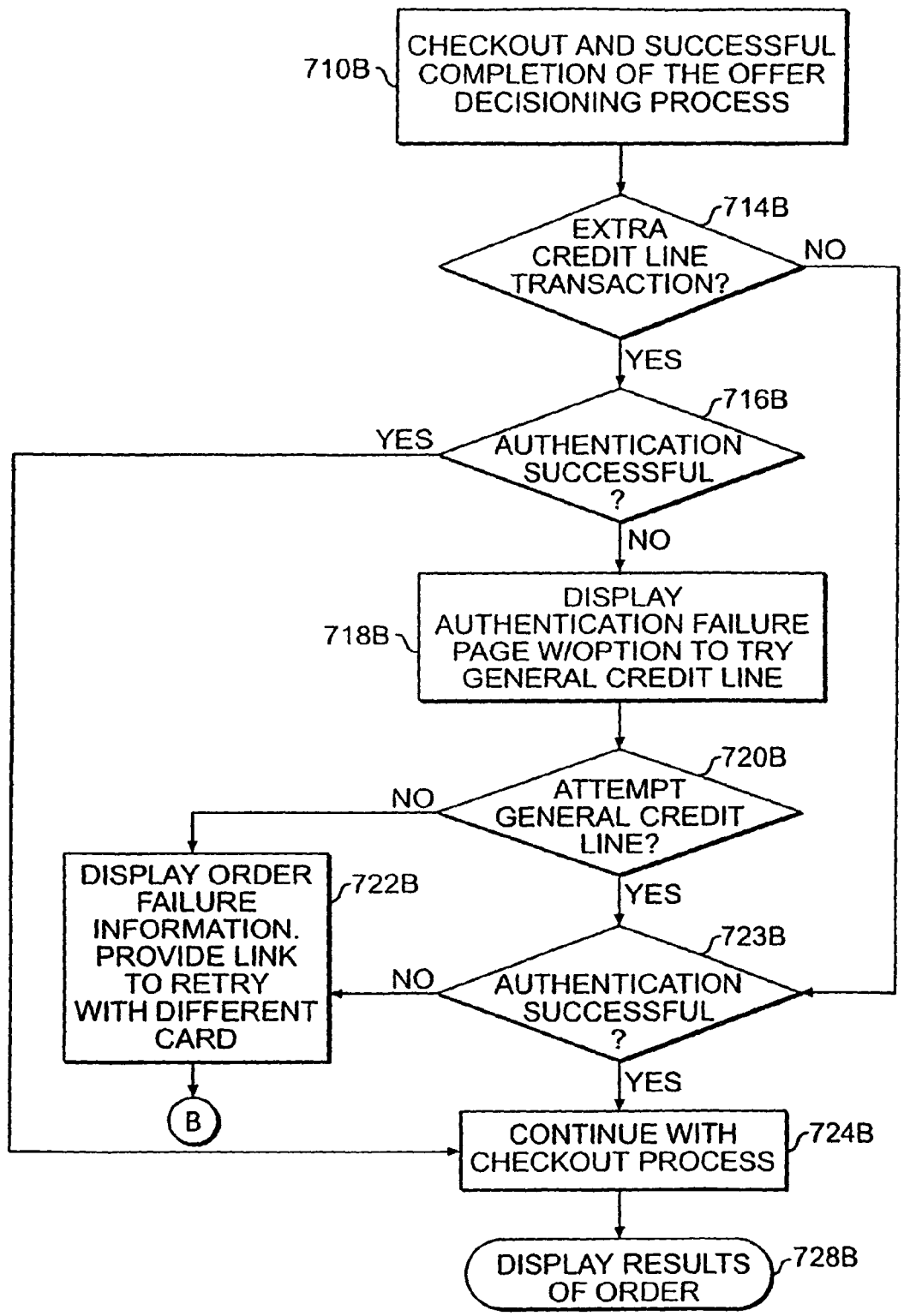

FIG. 7B illustrates an exemplary check out process that may be performed at a credit card issuer's branded web site. If the customer attempts to check out and the offer decisioning process was successfully completed (Step 710B), server 612 checks the extra credit line indicator to determine whether the purchase transaction is related to a customer's extra credit line (Step 714B). If it is not (Step 714B; NO), processing is forwarded to Step 723B to check the authorization of the general purpose credit line. However, if the purchase is an extra credit line transaction (Step 714B; YES), web server 612 forwards the appropriate billing information to secondary web server 622, which then forwards the information to secondary backend system 624. Secondary backend system 624 then generates an authorization request based on the extra credit line information received in the customer's order, and sends the request to interchange network 630 for authorization by the credit card issuer.

Once credit card issuer authorization system 632 receives the transaction information, it performs authorization checks against the customer's extra credit line. This may include checking balances, account information, expiration date information and any other known authorization functions needed to ensure the purchase is valid. Authorization system 632 produces an authorization result, and sends the result back to secondary backend system 624 through network 630. Secondary backend system passes the results data back to the secondary web server 622 for continued processing. If the result received from system 632 indicates a valid transaction (Step 716B; YES), the check out process may continue (Step 724B). Thereafter, the customer's order is completed and a completion page is presented to the customer indicating the results of the purchase (Step 728B).

In the event authorization system 632 did not authorize the extra credit line purchase attempted by customer 610, an authorization denial page is displayed to the customer (Step 718B). Additionally, the customer is presented with an offer to utilize their general line of credit. If the customer declines to use their general credit line (Step 720B; NO), an order failure page is displayed to the customer indicating that the purchase was not processed. In one aspect of the invention, the customer may also be provided with a link to try and use another credit card issued from a different card issuer than the one hosting the web site (Step 722B).

Referring back to step 720B, in the event the customer accepted the offer to use their general credit line (Step 720B; YES), authorization of the general credit line is determined. As previously indicated, extra credit system 632 determines whether the customer's general credit line may be used for the attempted purchase. If authorization failed (Step 723B; NO), an order failure page is displayed to the customer indicating failure of the attempted purchase. In one aspect of the invention, the customer may also be provided with a link to try and use another credit card issued from a different card issuer than the one hosting the web site (Step 722B). However, if the general credit line was authorized (Step 723B; YES), the check out process may continue (Step 724B). Thereafter, the customer's order is completed and a page is presented to the customer indicating the results of the purchase (Step 728B).

The versatility offered to customers in activating and using extra credit lines allows credit card issuers to provide user-friendly credit card products, while maintaining control over credit processing operations. Also, customers of the credit card issuer are given versatility in terms of payment options with multiple credit lines.

Payments made by a customer to a credit card issuer are based on an account statement. The account statement may be issued each billing cycle and indicate, for example: the available balance for each credit line; previous transactions applied to specified credit lines; outstanding balances for each credit line; minimum payment due; and the date the payment is due. Of course, other information may be included in each account statement (i.e., interest rate(s), contact information, etc.) as well. A customer may pay the credit card issuer by making a payment that is anywhere between an amount equivalent to the minimum payment due and the outstanding balance due. Once a credit card issuer receives payment, it is normally applied to the general purpose credit line or cash advance line, depending on the terms of the credit agreement established with the customer. However, with credit card accounts that include extra credit lines associated with the features of the present invention, additional payment options may be available to the customer and credit card issuer.

For example, a credit card issuer may apply a payment first to a general purpose credit line and then to multiple credit lines proportionally or by fixed amount. Alternatively, payments received by a customer may be applied proportionally to each credit line that has an outstanding balance. In either case, the exact manner by which a credit card issuer will apply payments will be indicated to a customer in a credit card agreement offered to the customer. Proportional payments allow credit card issuer to divide a payment into sub-payments for application to the credit lines with outstanding balances. For instance, if a customer has three credit lines (a general purpose credit line, a cash advance credit line and a extra credit line), payment from the customer may be distributed proportionally among the credit lines. On the other hand, the payment may be applied at a fixed amount to a selected credit line, until the outstanding balance of the selected credit line is reduced to zero. These payment options are demonstrated below with the example presented in Table II, which illustrates exemplary payment options for a customer who has three credit lines.

TABLE II

Example of Payment Options

| | Payment Amount | $1^{st}$ Bucket Available Balance- General Purpose Credit Line | $1^{st}$ Bucket Outstanding Balance- General Purpose Credit Line | $2^{nd}$ Bucket Available Balance- Cash Advance | $2^{nd}$ Bucket Outstanding Balance- Cash Advance | $3^{rd}$ Bucket Available Balance- Extra Credit Line | $3^{rd}$ Bucket Outstanding Balance- Extra Credit Line |
|---|---|---|---|---|---|---|---|
| | | $800 | $200 | $500 | $0 | $100 | $100 |
| Opt. 1 | $200 | $900 | $100 | $500 | $0 | $200 | $0 |
| Opt. 2 | $250 | $1000 | $0 | $500 | $0 | $150 | $50 |

In the example of Table II, the $1^{st}$ bucket is associated with the customer's general purpose credit line, the $2^{nd}$ with cash advances, and the $3^{rd}$ bucket with an extra credit line. In this example, assume that the customer makes a $200 payment to a credit card issuer. Option 1 (Opt. 1) illustrates the process where the payment is proportionally applied to each of the customer's three credit lines. In this instance, the credit card issuer has established a payment ratio that is equivalent for all three credit lines. That is, a customer's payment may be separated into equal sub-payments that are applied to each credit line. Of course, the credit card issuer may establish a variety of payment rations that are not symmetrical to the number of credit lines a customer has activated. In the example of Table II, because there is no outstanding balance for the $2^{nd}$ bucket, the customer's payment is split into two equal sub-payments (i.e., two $100 payments) that are applied to the general purpose credit line and extra credit line, respectively. As shown, one $100 sub-payment is applied to the $1^{st}$ bucket (reducing the outstanding balance from $200 to $100 and increasing the available balance from $800 to $900). The remaining $100 sub-payment is applied to the $3^{rd}$ bucket (reducing the outstanding balance from $100 to $0 and increasing the available balance from $100 to $200).

Option 2 (Opt. 2) in Table II illustrates the process where the payment is applied to the three credit lines at fixed amounts. In this option, the payment amount is first applied to the $1^{st}$ bucket's outstanding balance. As shown, the $250 payment is applied to the $1^{st}$ bucket outstanding balance (reducing the outstanding balance from $200 to $0 and increasing the available balance from $800 to $1000). The remaining $50 of the customer's payment is then applied to the 3$^{rd}$ bucket (reducing the outstanding balance from $100 to $50 and increasing the available balance from $100 to $150). Thus, with a fixed payment option, payments may be first applied to the general line of credit until the outstanding balance is reduced to zero, and remaining payments may be subsequently applied to the remaining credit lines.

As can be seen, payment option(s) allow versatility in the processing of credit card account payments received from customers. The examples illustrated in Table II are exemplary and should not be considered limiting. A number of additional payment options may also be instituted by credit card issuer. For instance, the ratios used in the proportion payment option may be adjusted to a number of different values. Additionally, in the fixed payment option, the extra credit line may have a payment applied until its outstanding balance is reduced to zero prior to applying payments to the general credit line.

As described, the present invention enables credit card holders to obtain extra lines of credit without waiting for new cards to be issued by a credit card issuer. The present invention also provides purchasing advantages to customers though the use of multiple lines of credit. Other embodiments of the invention will be apparent to those skilled in the art from consideration of the specification and practice of the invention disclosed herein. It is intended that the specification and examples be considered as exemplary only, with a true scope and spirit of the invention being indicated by the following claims. For example, in addition to associating selected vendor(s) with extra line(s) of credit that have been added to an existing credit card product, the features of the present invention may also be implemented with newly issued credit cards with extra credit lines. That is, customers who have been authorized to receive a new credit card from the credit card issuer 1200, may also have the advantages of vendor profiles associated with extra line(s) of credit. These customers may be given the opportunity to select and edit the vendor profiles just as the customers who have had extra credit lines added to their existing credit cards. The same extra credit line procedures previously described may be followed to offer and customize a newly issued credit card with extra lines of credit with associated vendor profiles for customers.

What is claimed is:

1. A method, implemented using a computer, for providing at least one extra credit line to an existing credit card account, comprising:
    determining, using the computer, a target customer group from a set of customers, wherein each customer in the set of customers holds an existing credit card account issued by a credit card issuer;
    determining, using the computer, a target time to send an additional financial card product to each customer in the target customer group;
    defining, by the computer, one or more attributes associated with the additional financial card product; and
    sending, using the computer, the additional financial card product to each customer in the target customer group at the target time.

2. The method of claim 1, wherein the determination of the target time to send the additional financial card product to each customer in the target customer group includes:
    analyzing one or more purchases made by at least one customer in the target customer group; and
    determining the target time based on the one or more purchases.

3. The method of claim 1, further including:
    defining a first credit limit for the additional financial card product, wherein the first credit limit is based on a second credit limit associated with the primary financial card product.

4. The method of claim 1, wherein defining the one or more attributes further includes:
    analyzing one or more purchases made by at least one customer in the target customer group; and
    defining the one or more attributes based on the one or more purchases.

5. The method of claim 1, wherein the one or more attributes includes at least one of an interest rate to apply against purchases made using the additional financial card product, a monthly minimum payment amount, one or more fees, a grace period, and one or more usage limitations.

6. The method of claim 5, wherein the one or more usage limitations includes at least one of an amount-based limitation, a proximity-based limitation, and a vendor-based limitation.

7. The method of claim 5, wherein the one or more fees includes at least one of an activation fee and a transaction fee.

8. The method of claim 1, wherein the primary financial card product is a credit card.

9. A non-transitory computer-readable medium including instructions for performing a method, when executed by a processor, for providing at least one extra credit line to an existing credit card account, the method comprising:
    determining, using the computer, a target customer group from a set of customers, wherein each customer in the set of customers holds an existing credit card account issued by a credit card issuer;
    determining, using the computer, a target time to send an additional financial card product to each customer in the target customer group;
    defining, by the computer, one or more attributes associated with the additional financial card product; and
    sending, using the computer, the additional financial card product to each customer in the target customer group at the target time.

10. The computer-readable medium of claim 9, wherein the determination of the target time to send the additional financial card product to each customer in the target customer group includes:
    analyzing one or more purchases made by at least one customer in the target customer group; and
    determining the target time based on the one or more purchases.

11. The computer-readable medium of claim 9, further including:
    defining a first credit limit for the additional financial card product, wherein the first credit limit is based on a second credit limit associated with the primary financial card product.

12. The computer-readable medium of claim 9, wherein defining the one or more attributes further includes:
    analyzing one or more purchases made by at least one customer in the target customer group; and
    defining the one or more attributes based on the one or more purchases.

13. The computer-readable medium of claim 9, wherein the one or more attributes includes at least one of an interest rate to apply against purchases made using the additional financial card product, a monthly minimum payment amount, one or more fees, a grace period, and one or more usage limitations.

14. The computer-readable medium of claim 13, wherein the one or more usage limitations includes at least one of an amount-based limitation, a proximity-based limitation, and a vendor-based limitation.

15. The computer-readable medium of claim 13, wherein the one or more fees includes at least one of an activation fee and a transaction fee.

16. The computer-readable medium of claim 9, wherein the primary financial card product is a credit card.

17. A system for providing extra credit lines to credit cards with existing lines of credit, comprising:
   a central processing unit;
   a memory unit, communicatively connected to the central processing unit and containing instructions that are executed by the central processing unit to perform a method comprising:
      determining a target customer group from a set of customers, wherein each customer in the set of customers holds an existing credit card account issued by a credit card issuer;
      determining a target time to send an additional financial card product to each customer in the target customer group;
      defining one or more attributes associated with the additional financial card product; and
      sending the additional financial card product to each customer in the target customer group at the target time.

18. The system of claim 17, wherein the determination of the target time to send the additional financial card product to each customer in the target customer group includes:
   analyzing one or more purchases made by at least one customer in the target customer group; and
   determining the target time based on the one or more purchases.

19. The system of claim 17, the method further including:
   defining a first credit limit for the additional financial card product, wherein the first credit limit is based on a second credit limit associated with the primary financial card product.

20. The system of claim 17, wherein defining the one or more attributes further includes:
   analyzing one or more purchases made by at least one customer in the target customer group; and
   defining the one or more attributes based on the one or more purchases.

21. The system of claim 17, wherein the one or more attributes includes at least one of an interest rate to apply against purchases made using the additional financial card product, a monthly minimum payment amount, one or more fees, a grace period, and one or more usage limitations.

22. The system of claim 21, wherein the one or more usage limitations includes at least one of an amount-based limitation, a proximity-based limitation, and a vendor-based limitation.

23. The system of claim 21, wherein the one or more fees includes at least one of an activation fee and a transaction fee.

24. The system of claim 17, wherein the primary financial card product is a credit card.

* * * * *